(12) United States Patent
Vetrovec

(10) Patent No.: US 7,200,161 B2
(45) Date of Patent: Apr. 3, 2007

(54) SIDE-PUMPED SOLID-STATE DISK LASER FOR HIGH-AVERAGE POWER

(75) Inventor: Jan Vetrovec, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 274 days.

(21) Appl. No.: 10/862,887

(22) Filed: Jun. 7, 2004

(65) Prior Publication Data

US 2005/0058173 A1  Mar. 17, 2005

Related U.S. Application Data

(63) Continuation-in-part of application No. 10/662,023, filed on Sep. 12, 2003, now Pat. No. 6,999,839, which is a continuation-in-part of application No. 09/767,202, filed on Jan. 22, 2001, now Pat. No. 6,625,193.

(51) Int. Cl.
   *H01S 3/091* (2006.01)
(52) U.S. Cl. ............... 372/70; 372/35; 372/72; 372/75
(58) Field of Classification Search ........ 372/70, 372/35, 72, 75; 700/166
   See application file for complete search history.

(56) References Cited

U.S. PATENT DOCUMENTS

| | | |
|---|---|---|
| 3,631,362 A | 12/1971 | Almasi et al. |
| 4,029,400 A | 6/1977 | Eitel |
| 4,357,704 A | 11/1982 | Koechner |
| 4,657,358 A | 4/1987 | Anthony et al. |
| 4,791,634 A | 12/1988 | Miyake |
| 4,837,771 A | 6/1989 | Baer |
| 4,849,036 A | 7/1989 | Powell et al. |
| 4,944,580 A | 7/1990 | MacDonald et al. |
| 5,253,260 A | 10/1993 | Palombo |

(Continued)

FOREIGN PATENT DOCUMENTS

DE   42 39 653 A1   6/1994

(Continued)

OTHER PUBLICATIONS

Department of Defense—Report of the High Energy Laser Executive Review Panel entitled "Department of Defense Laser Master Plan" dated Mar. 24, 2000.

(Continued)

*Primary Examiner*—Albert W. Paladini
(74) *Attorney, Agent, or Firm*—Harness, Dickey & Pierce, P.L.C.

(57) ABSTRACT

A solid state laser module for amplification of laser radiation. The module includes a laser gain medium having a pair of generally parallel surfaces that form a disc-like shape, that receive and transmit laser radiation. At least one perimetral optical medium is disposed adjacent a peripheral edge of the laser gain medium and in optical communication therewith. A source of optical pump radiation directs optical pump radiation into the perimetral optical medium generally normal to the parallel surfaces and the perimetral optical medium transports the optical pump radiation into the laser gain medium to pump the laser gain medium to a laser transition level. Alternative embodiments include arrangements for directing cooling fluids between adjacently disposed laser gain media.

63 Claims, 20 Drawing Sheets

U.S. PATENT DOCUMENTS

| | | | |
|---|---|---|---|
| 5,335,237 | A | 8/1994 | Zapata |
| 5,425,044 | A | 6/1995 | Schlie et al. |
| 5,441,803 | A | 8/1995 | Meissner |
| 5,504,764 | A | 4/1996 | Pohlmann et al. |
| 5,553,088 | A | 9/1996 | Brauch et al. |
| 5,563,899 | A | 10/1996 | Meissner et al. |
| 5,579,333 | A | 11/1996 | Neil et al. |
| 5,610,751 | A | 3/1997 | Sweeney et al. |
| 5,661,738 | A | 8/1997 | Yasui et al. |
| 5,699,372 | A | 12/1997 | Okazaki |
| 5,703,893 | A | 12/1997 | Komiyama et al. |
| 5,796,761 | A | 8/1998 | Injeyan et al. |
| 5,832,015 | A | 11/1998 | Goto et al. |
| 5,846,638 | A | 12/1998 | Meissner |
| 5,856,996 | A | 1/1999 | Durkin et al. |
| 5,872,803 | A | 2/1999 | Mori et al. |
| 5,872,804 | A | 2/1999 | Kan et al. |
| 5,875,206 | A | 2/1999 | Chang |
| 5,903,583 | A | 5/1999 | Ullman et al. |
| 5,936,984 | A | 8/1999 | Meissner et al. |
| 5,978,407 | A | 11/1999 | Chang et al. |
| 6,055,260 | A | 4/2000 | Byren et al. |
| 6,058,711 | A | 5/2000 | Maciaszek et al. |
| 6,094,447 | A | 7/2000 | Drake, Jr. |
| 6,192,061 | B1 | 2/2001 | Hart et al. |
| 6,241,008 | B1 | 6/2001 | Dunbar |
| 6,339,605 | B1 | 1/2002 | Vetrovec |
| 6,418,156 | B1 | 7/2002 | Peressini |
| 6,625,193 | B2 * | 9/2003 | Vetrovec ............... 372/70 |
| 6,657,778 | B1 | 12/2003 | Motoshima et al. |
| 2002/0097769 | A1 | 7/2002 | Vetrovec |

FOREIGN PATENT DOCUMENTS

| | | |
|---|---|---|
| EP | 0 078 654 | 10/1982 |
| EP | 1 231 683 A2 | 8/2002 |
| EP | 1 480 299 A1 | 11/2004 |

OTHER PUBLICATIONS

"Diode-Pumped Active Mirror Amplifier for High-Average Power" Proceedings of the International Conference on Lasers 2000, Alburquerque, NM, USA Dec. 4-8, 2000, pp. 776-783, XP008006202 2001, McLean, VA, USA, STS Press, USA the whole document.

"Diode-Pumped Active Mirror Amplifier for High-Average Power" Proceedings of the International Conference on Lasers 2000, Albuquerque, NM, USA Dec. 4-8, 2000, pp. 776-783, XP008006202 2001, McLean, VA USA, STS Press, USA the whole document.

Proceedings of the SPIE—The International Society for Optical Engineering SPIE—Int. Soc. Opt. Eng USA, Vetrovec, J.; "Compact active Mirror Laser (CAMIL)"; vol. 4630, 2002, pp. 1-12, XP002310313.

Proc Spie Int. Soc Opt Eng; Proceedings of SPIE—The International Society for Optical Engineering Nov. 2003, Vetrovec, et al "Solid-State Disk Laser for High-Average Power" vol. 5120, Aug. 25, 2002, pp. 731-734, XP002310314.

"Development of solid-state disk laser for high-average power"; Proceedings of the SPIE—The International Society for Optical Engineering SPIE-INT. Soc. Eng USA, vol. 4968, Jun. 2003, pp. 54-64, XP002310315; ISSN 0277-786X.

"Diode Edge-Pumped Microchip Composite YB: YAG Laser"; Japanese Journal of Applied Physics, Publication Office Japanese Journal of Applied Physics, Tokyo, JP, vol. 41, No. 6A, part 2, Jun. 1, 2002, pp. L606-L608.

Kelly, J H et al, "High-Repitition Rate CR:ND;GSGG Active-Mirror Amplifier" Optics Letters; Optical Society of America, Washington, US vol. 12, No. 12, Dec. 1987, pp. 996-998, XP002069938.

* cited by examiner

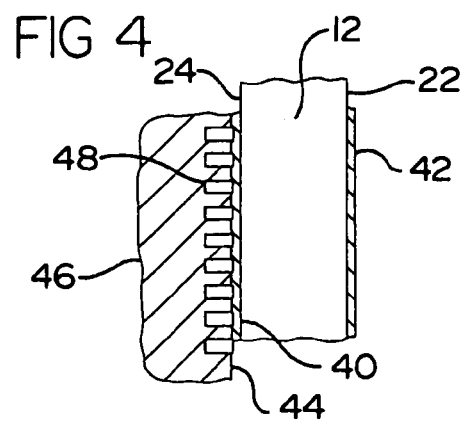
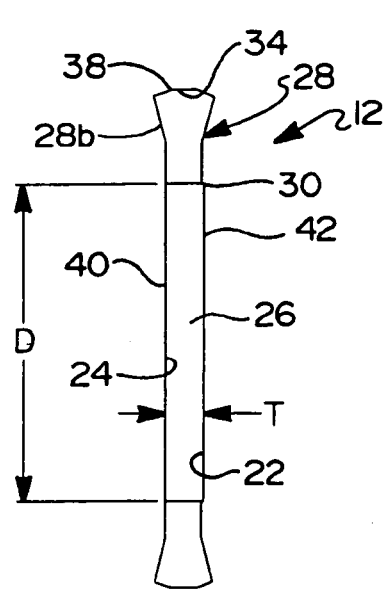
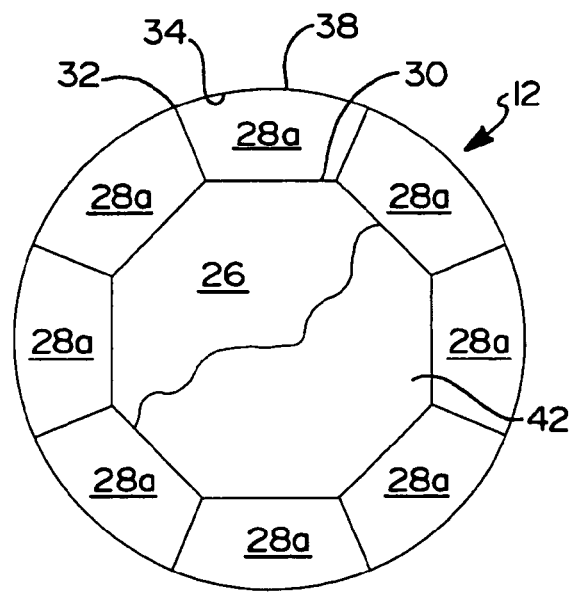

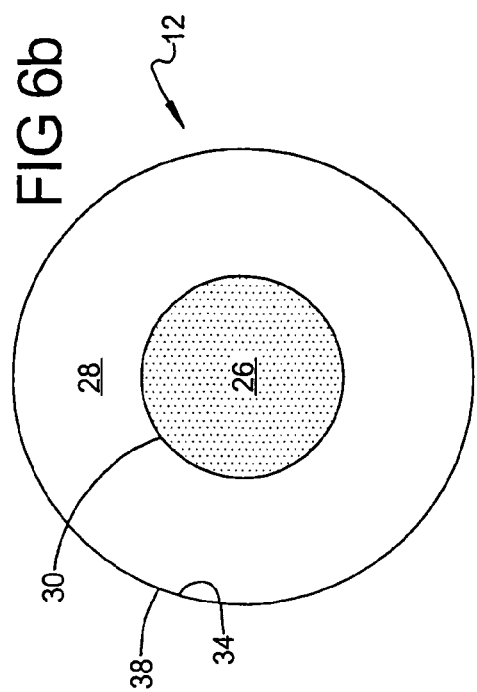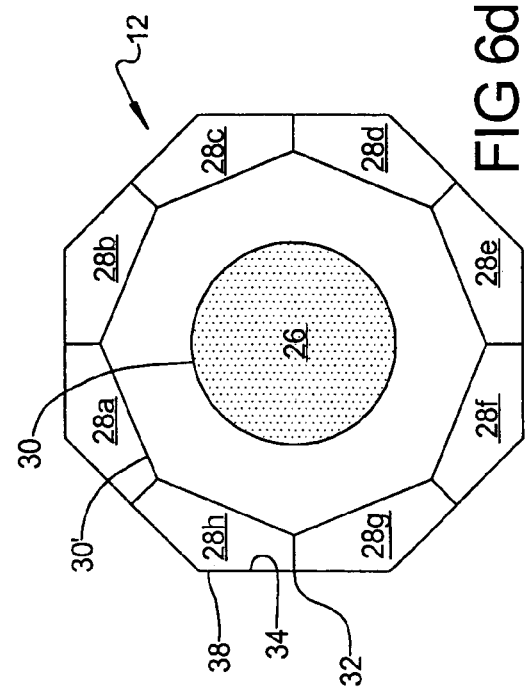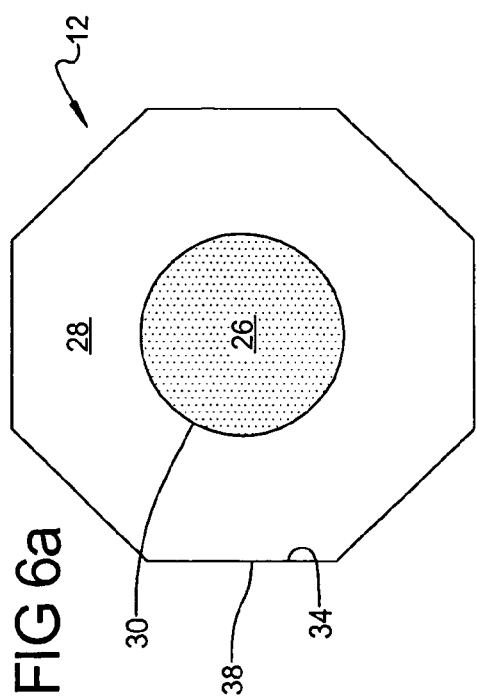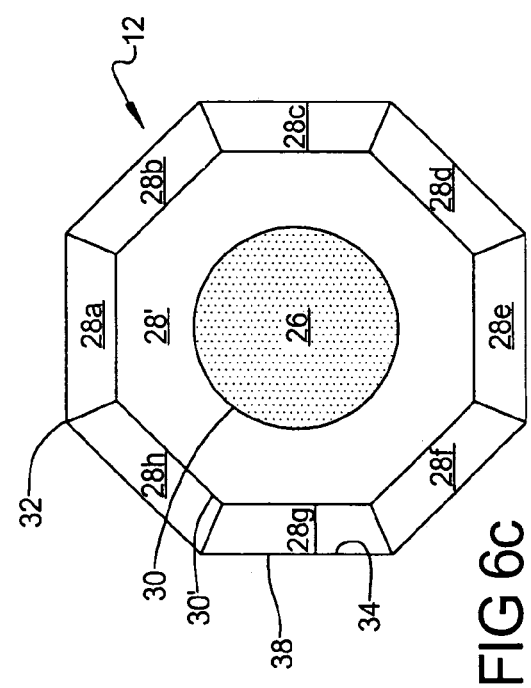

SIDE-PUMPED SOLID-STATE DISK LASER FOR HIGH-AVERAGE POWER

CROSS-REFERENCE TO RELATED APPLICATIONS

This application is a continuation-in-part of U.S. application Ser. No. 10/662,023 filed on Sep. 12, 2003, now U.S. Pat. No. 6,999,839 which is a continuation-in-part of Ser. No. 09/767,202, filed Jan. 22, 2001, now U.S. Pat. No. 6,625,193 B2, issued Sep. 23, 2003, the disclosures of both of which are incorporated herein by reference.

FIELD OF THE INVENTION

This invention relates to solid-state lasers, and more particularly to solid-state disk laser having a side-pumped gain medium cooled on at least one of its facial surfaces.

BACKGROUND OF THE INVENTION

In solid-state lasers (SSL), optical pumping generates a large amount of heat within a laser medium and increases its temperature. Continuous operation of the laser, therefore, requires removal of the waste heat by cooling selected surfaces of the laser medium. Because SSL media typically have a low thermal conductivity, a significant thermal gradient is created between the hot interior and the cooled outer surfaces. This causes a gradient in the index of refraction, mechanical stresses, depolarization, detuning, and other effects, with likely consequences of degraded beam quality, reduced laser power, and possibly a fracture of the SSL medium. Such effects present a major challenge to scaling of SSLs to high-average power (HAP). Pumping by semiconductor laser diodes, which was introduced in the 1990's, greatly reduces the amount of waste heat and paves the way for development of a high-average power (HAP) SSL with good beam quality (BQ). Such lasers are expected to make practical new industrial processes such as precision laser machining with applications ranging from deep penetration welding to processing of aerospace materials.

It has been long recognized that optical distortions caused by transverse temperature gradients (i.e., perpendicular to laser beam axis) degrade beam quality. A class of SSL known as "disk lasers" avoids transverse temperature gradients because waste heat is extracted from the disk in the direction parallel to the laser beam axis. Because of this one-dimensional heat flow, solid-state disk lasers (SSDL) enjoy inherently low susceptibility to thermal lensing and stress birefringence. In addition, their large, round aperture reduces diffraction and beam clipping losses experienced by other SSL configurations. SSDL may use "transmissive" disks having antireflective coatings on each face or "reflective" disks having an antireflective coating on one face and highly reflective coating on the other. In a transmissive disk, waste heat is removed by a coolant (usually gas) flowing through the laser beam path. In a reflective disk, also known as an "active mirror amplifier" (AMA), the back surface of the disk is available for liquid cooling, which can be applied more uniformly, and can easily handle heat fluxes. Both disk laser types (transmissive and reflective) have been in development since the late 1960s, especially as amplifiers for giant pulse lasers for inertial confinement fusion.

The AMA was originally disclosed by Almasi et al. in U.S. Pat. No. 3,631,362 (1971) and has shown effective reduction of transverse temperature gradients and demonstrated the generation of a laser output with very good beam quality. See, for example, J. Abate et al., "Active Mirror: A large-aperture Medium Repetition Rate Nd: Glass Amplifier," Appl. Opt. Vol. 20, no. 2, 351–361 (1981) and D. C. Brown et al., "Active-mirror Amplifier: Progress and Prospects," IEEE J. of Quant. Electr., vol. 17, no. 9, 1755–1765 (1981).

In the classical AMA concept, a large aspect ratio, edge-suspended, Nd-Glass disk (or slab) several centimeters thick is pumped by flashlamps and liquid-cooled on the back face. However, this device is not suitable for operation at high-average power because of poor heat removal and resulting thermo-mechanical distortion of the edge-suspended disk. Previous attempts to mitigate these problems and increase the average power output of an SSDL were met with encouraging but limited results. In recent years, the SSDL concept has been revived in the form of a "thin disk laser" AMA introduced by Brauch et al. in U.S. Pat. No. 5,553,088. The thin disk laser uses a gain medium disk which is several millimeters in diameter and 200–400 micrometers in thickness soldered to a heat sink. See, for example, A. Giesen et al., "Scalable concept for diode-pumped high-power lasers," Appl. Phys. B vol. 58, 365–372 (1994). The diode-pumped Yb:YAG thin disk laser has demonstrated laser outputs approaching 1 kW average power and with beam quality around 12 times the diffraction limit. See, for example, C. Stewen et al., "1-kW CW Thin Disk Laser," IEEE J. of Selected Topics in Quant. Electr., vol. 6, no. 4, 650–657 (July/August 2000). Another variant of the thin disk laser can be found in L. Zapata et al., "Composite Thin-Disk Laser Scalable To 100 kW Average Power Output and Beyond," in Technical Digest from the Solid-State and Diode Laser Technology Review held in Albuquerque, N. Mex., Jun. 5–8, 2000.

The applicant's U.S. Pat. No. 6,339,605 titled "Active Mirror Amplifier System and Method for a High-Average Power Laser System", hereby incorporated by reference, discloses a new SSDL concept, which is suitable for operation at high-average power. The invention uses a large aperture laser gain medium disk about 2.5 mm in thickness and with a diameter typically between 5 cm and 15 cm mounted on a rigid, cooled substrate. Note that the disk thickness in this SSDL concept is about 10 times less than in the classical SSDL and about 10 times more than in the thin disk laser. The substrate contains a heat exchanger and microchannels on the surface facing the laser medium disk. The disk is attached to the substrate by a hydrostatic pressure differential between the surrounding atmosphere and the gas or liquid medium in the microchannels. This novel approach permits thermal expansion of the laser medium disk in the transverse direction while maintaining a thermally loaded disk in a flat condition. The teachings of this patent provide numerous advantages over prior art SSL devices and allow generation of near diffraction limited laser output at very high-average power from a relatively compact device.

The above-mentioned U.S. Pat. No. 6,339,605 also teaches two principal methods for providing pump radiation into the SSDL disk, namely 1) through the large(front or back) face of the disk, or 2) through the sides (edges) of the disk. Side-pumping takes advantage of the long absorption path (approximately same dimension as the diameter of the gain medium disk), which permits doping the disk with a reduced concentration of lasant ions. When quasi-3 level lasing ions are used, reduced doping associated with side-pumped SSDL conveniently reduces pump radiation intensity required to induce laser medium transparency at laser wavelength. In addition, long absorption in a side-pumped SSDL permits the use of laser ions with small pump cross-sections that may be otherwise impractical to use for face-pumping.

A side-pumped SSDL is disclosed in U.S. Pat. No. 6,625,193 granted to the Applicant and in Applicant's co-pending U.S. Pat. application Ser. No. 10/662,063 filed on Sep. 12, 2003.

While side-pumping is a suitable method for delivering pump radiation, several associated technical challenges still need to be overcome, such as: 1) delivering and concentrating pump radiation into the relatively small area around the disk perimeter; 2) preventing overheating of the disk in the areas where the pump radiation is injected; 3) generating uniform laser gain over the SSDL aperture; and 4) avoiding laser gain depletion by amplified spontaneous emission (ASE) and parasitic oscillations. The significance of these challenges and related solutions disclosed in the prior art are discussed below.

Concentration of Pump Radiation

Modern SSL are optically pumped by semiconductor lasers commonly known as laser diodes. Because each laser diode produces a relatively small optical output (up to a few watts), pumping of SSL for HAP requires the combined output of a great many laser diodes (typically in quantities ranging from hundreds to hundreds of thousands). For this purpose the diodes are arranged in one-dimensional arrays often called "bars" containing about 10 to 100 diodes and two-dimensional arrays often called "stacks" containing several hundred to several thousand diodes. Bars are frequently mounted on water-cooled heat exchangers. Stacks are typically produced by stacking up to about 100 bars and mounting them onto a heat exchanger or by stacking up to about 20 bars already mounted on their individual heat exchangers. A good example of commercially available stacks is the Model SDL-3233-MD available from SDL, Inc., of San Jose, Calif., which can produce 200 microsecond-long optical pulses with a total output of 960 watts at a maximum 20% duty factor. SSL for HAP may require a combined power of multiple diode bars to produce desired pumping effect in the laser gain medium. Regardless of the grouping configuration, individual laser diodes emit optical radiation from a surface, which is several micrometers high and on the order of 100 micrometers wide. As a result, the beamlet of radiation emitted from this surface is highly asymmetric: highly divergent in a direction of the 1 .mu.m dimension (so called "fast axis") and moderately divergent in the transverse dimension (so-called "slow axis"). This situation is illustrated in FIG. 2. Typical fast axis divergence angles (full-width at half-maximum intensity) range from 30 to 60 degrees, while slow axis divergence angles typically range from 8 to 12 degrees. Optical radiation from an array of diodes has similar properties. High divergence in the fast axis makes it more challenging to harness the emitted power of diode arrays for use in many applications of practical interest. Some manufacturers incorporate microlenses in their laser diode arrays to reduce fast axis divergence to as little as a few degrees. An example of such a product is the lensed diode array Model LAR23P500 available from Industrial Microphotonics Company in St. Charles, Mo., which includes microlenses which reduce fast axis divergence to less than three degrees.

The intensity of the optical output of diode arrays (lensed or unlensed) is sometimes insufficient to pump a SSL gain medium to inversion, and the radiation must therefore be further concentrated. In previously developed systems, optical trains with multiple reflecting and/or refracting elements have been used. See, for example, F. Daiminger et al., "High-power Laser Diodes, Laser Diode Modules And Their Applications," SPIE volume 3682, pages 13–23, 1998. Another approach disclosed by Beach et al., in U.S. Pat. No. 5,307,430 uses a lensing duct generally configured as a tapered rod of rectangular cross-section made of a material optically transparent at laser pump wavelength. Operation of this device relies on the combined effect of lensing at the curved input surface and channeling by total internal reflection. Light is concentrated as it travels from the larger area input end of the duct to the smaller area exit end. Yet another approach for concentrating pump radiation disclosed by Beach et al. in U.S. Pat. No. 6,160,939 uses a combination of a lens and a hollow tapered duct with highly reflective internal surfaces.

Thermal Control of Disk Perimeter

The surfaces of the laser gain medium that receive pump radiation are susceptible to overheating and, as a result, to excessive thermal stresses. Experience with end-pumped rod lasers shows that a composite rod having a section of doped and undoped laser material provides improved thermal control and concomitant reduction in thermal stresses. See, for example, R. J. Beach et al., "High-Average Power Diode-pumped Yb:YAG Lasers," UCRL-JC-133848 available from the Technical Information Department of the Lawrence Livermore National Laboratory, U.S. Department of Energy. A suitable method for constructing composite optical materials of many different configurations is disclosed by Meissner in U.S. Pat. No. 5,846,634. Another method suitable for forming glass optics involves casting and fusion bonding doped, undoped, or differently doped sections. Such a method is available from Kigre Inc., Hilton Island, S.C. Yet another method suitable for construction of composite polycrystalline materials is available from Baikowski International, Corp. of Charlotte, N.C.

Uniform Laser Gain Across the Aperture

Due to the exponential absorption of pump radiation, portions of the laser gain medium that are closer to the pump source are susceptible to being pumped more intensely than portions that are further away. Non-uniform deposition of pump energy can result in non-uniform gain. Gain non-uniformities across the laser beam aperture (normal to the laser beam axis) are highly undesirable as they lead to degradation of beam quality. In prior art devices, non-uniform pump absorption has been compensated for in a side-pumped rod laser by the gain medium being fabricated with a radially varying level of doping. Gain uniformity in a side-pumped SSDL can be also improved by appropriately arranging pump diodes around the perimeter of the laser disk. Suitable techniques for this purpose are disclosed by the Applicant in a co-pending U.S. patent application Ser. No. 10/441,373 filed on May 19, 2003. An alternate approach to achieving uniform gain is known as "bleach-wave pumping" which has been proposed by W. Krupke in "Ground-state Depleted Solid-state Lasers: Principles, Characteristics and Scaling," Opt. and Quant. Electronics, vol. 22, S1–S22 (1990). Bleach wave pumping largely depletes the atoms in the ground energy state and pumps them into higher energy states. Achieving high uniformity of gain becomes even more challenging as the incident laser beam causes saturation-induced change in the spatial distribution of gain. Thus, the weaker portions of the signal are amplified relatively more than the stronger portions because they saturate the medium to a lesser degree.

Amplified Spontaneous Emission (ASE)

Amplified Spontaneous Emission (ASE) is a phenomenon wherein spontaneously emitted photons traverse the laser gain medium and are amplified before they exit the gain medium. The favorable condition for ASE is a combination of high gain and a long path for the spontaneously emitted photons. ASE depopulates the upper energy level in an excited laser gain medium and robs the laser of its power. Furthermore, reflection of ASE photons at gain medium boundaries may provide feedback for parasitic oscillations that aggravate the loss of laser power. If unchecked, ASE may become large enough to deplete the upper level inversion in high-gain laser amplifiers. Experimental data suggests that in q-switched rod amplifiers ASE loss becomes significant when the product of gain and length becomes larger than 2.25, and parasitic oscillation loss becomes significant when the product is larger than 3.69. See, for example, N. P. Barnes et al., "Amplified Spontaneous Emission—Application to Nd:YAG Lasers," IEEE J. of Quant. Electr., vol. 35, no. 1 (January 2000). Continuous wave (CW) or quasi-CW lasers are less susceptible to ASE losses because their upper level population (and hence their gain) is clamped.

A traditional method for controlling ASE losses to an acceptable level is disclosed, for example, by Powell et al. in U.S. Pat. No. 4,849,036. This method involves cladding selected surfaces of the laser gain medium with a material that can efficiently absorb ASE radiation. In particular, it is well known in the art that each of divalent cobalt and divalent samarium ions can absorb ASE in Nd laser operating around 1.06 micrometer wavelength. In addition, divalent cobalt ions can absorb ASE radiation in an Er laser operating at a 1.54 micrometer wavelength. To reduce the reflection of ASE rays at the cladding junction, the cladding material must have an index of refraction at the laser wavelength that is closely matched to that of the laser gain medium. Recently, another method for ASE loss control was introduced. In this method, ASE rays are channeled out of selected laser gain medium surfaces into a trap from which they are prevented from returning. See, for example, R. J. Beach et al., "High-average Power Diode-pumped Yb:YAG Lasers," supra.

Materials and Methods for Low Waste Heat

To operate a SSL at HAP, it is critical to reduce as much as possible the Stokes shift (difference between the lasing wavelength and the pump wavelength), which is the leading energy loss mechanism contributing to production of waste heat. Waste heat is deposited into the gain medium where it is responsible for thermal lensing, mechanical stresses, depolarization, degradation of beam quality (BQ), loss of laser power, and (in extreme cases) thermal fracture. Consequently, when pumping a HAP SSL, it is highly desirable to use pump absorption features in proximity to the laser emission line.

The most important lasant ions for a HAP SSL operating near 1-micrometer wavelength are trivalent neodymium ($Nd^{3+}$) and trivalent ytterbium ($Yb^{3+}$). In addition, trivalent erbium ($Er^{3+}$), lasing at a 1.54 micrometer wavelength, is important for applications requiring increased eye damage threshold (also known as "eye-safe"). Each Nd, Yb, and Er can be doped into a variety of crystalline, polycrystalline and amorphous host materials.

A side-pumped SSDL disclosed herein makes it possible to reduce the Stokes shift in many important materials and allow Nd and Yb lasers to operate more efficiently. In particular, neodymium ion $Nd^{3+}$ is traditionally pumped by diodes on the 808-nm absorption line that has a large cross-section. In contrast, pumping Nd on a weaker absorption feature around 885 nm deposits energy directly into the upper lasing level. Direct pumping improves Stokes efficiency by nearly 10% and entirely avoids the quantum efficiency loss (estimated at 5% in Nd) associated with energy transfer from the pump band to the upper lasing level. A side-pumped disk is amenable to direct pumping of Nd despite having a low absorption cross-section and narrow width of absorption feature at a wavelength of around 885 nm.

Ytterbium is characterized by a Stokes shift several times smaller than for Neodymium. Yb:YAG and Yb:GGG are traditionally pumped at the broad absorption feature around 941 nm. A more efficient approach is to pump Yb at the zero-phonon line around 970 nm, which offers a smaller Stokes shift and deposits energy directly into the upper laser level. A side-pumped disk laser is amenable to pumping ytterbium despite its rather low absorption cross-sections in many host materials of practical interest, namely YAG, GGG, and glass. Low absorption cross-section makes it more problematic to absorb pump energy in a short distance, as may be desirable for face-pumping of disk and slab lasers or side-pumping rod lasers. A short absorption path in combination with small absorption cross-section necessitates high doping which, in turn, requires very high pump intensities to overcome re-absorption of laser radiation by the ground energy state. This problem is resolved with the side-pumped disk of subject invention, which offers a long absorption path.

Polycrystalline Host Materials: Host materials such as YAG and GGG for use in SSL have been traditionally produced in a single-crystal form typically using the Czochraski method. However, production of large crystals required for HAP SSL is a slow and expensive process. Furthermore, such crystals are very limited in size, contain undesired inclusions, frequently can be produced with uniform doping, and are polluted by trace elements from the melt container. Recently, polycrystalline YAG and other polycrystalline garnets have emerged as viable replacements for single-crystal materials, offering large size products at reduced cost, improved quality, and improved fracture resistance. Such materials have been developed in Japan by Konoshima Chemical Company and are marketed in the US by Baikowski International Corp. of Charlotte, N.C.

Athermal Glass

Waste heat deposited into a SSL gain medium causes temperature changes which result in thermo-optic distortions that may affect the optical phase-front of the amplified laser beam and degrade its beam quality. Such distortions include thermal expansion, change to the index of refraction (n), and thermal stress-induced birefringence. Materials have been developed that reduce some of these effects. In particular, a glass composition known as athermal glass compensates for the positive coefficient of thermal expansion by a negative coefficient of change to the refractive index (dn/dt) to produce a very low thermal coefficient of optical path. Glass with athermal properties is sold by Kigre Inc. of Hilton Head Island, S.C. under designations Q-98 and Q-100; and by Schott Glass Technologies, Inc., in Duryea, Pa. under designation LG-760.

SUMMARY OF THE INVENTION

In view of the foregoing limitations with previously developed SSDLs, it is an object of the present invention to provide a solid-state disk laser (SSDL) capable of operating at high-average power and with good beam quality (BQ). In particular, the SSDL of the present invention meets a number of significant needs:

a side-pumped SSDL for a HAP;

means for trapping and absorbing ASE rays, thereby significantly reducing feedback to parasitic oscillations;

means for concentrating pump radiation for injection into the AMA disk side;

means for concentrating pump radiation by arranging pump sources around the SSDL perimeter;

means for alleviating thermal stresses and reducing the temperature near surfaces of the laser gain medium where pump radiation is injected;

means for controlling the gain profile across the SSDL aperture;

means for efficient operation of an SSDL-HAP with quasi-3 level laser media such as $Yb.^{3+}$;

means for efficient operation of an SSDL-HAP with laser media exhibiting high pump saturation intensities;

an SSDL with laser diode pump means that reduces the waste heat load to the solid-state laser medium;

a relatively thin solid-state medium to allow efficient conduction of waste heat;

microchannel cooling of a support substrate for efficient removal of waste heat from the laser gain medium;

a substrate which provides rigid mechanical support for the solid-state laser medium;

the use of concentrator ducts for the delivery of pump power to the sides (edges) of the SSDL laser gain medium;

a composite gain medium assembly for the delivery of pump radiation, reduced thermal distortions and reduced ASE/parasitic losses;

hydrostatic pressure means to maintain the solid-state gain medium in an optically flat condition on said substrate;

attachment means that reduce thermally-induced distortions in the solid-state gain medium;

a longer absorption path for pump radiation, which allows reducing the laser gain medium doping requirements and concomitant reabsorption losses for the gain media of 3-level lasers (e.g., Yb:YAG); and cooling an SSDL gain medium by flowing gas over the disk face;

operation of an SSDL in a heat capacity mode;

de-correlation of optical path errors in multiple SSDL modules;

alternately operating selected SSDL modules in a bank of multiple SSDL modules to improve heat extraction to gaseous coolant; and injecting pump light through ASE absorbing material.

The SSDL of the present invention can be used as a building block for construction of laser oscillators as well as laser amplifiers. In one preferred embodiment the invention comprises a laser gain medium having a front surface, a rear surface and a peripheral edge. The rear surface is attached to a cooled support substrate. One or more sources of optical pump radiation are disposed so as to inject optical pump radiation into one or more sections of the peripheral edge of the gain medium. Optionally, a perimetral optical medium may be attached to the peripheral edge of the laser gain medium inbetween the peripheral edge and one of the sources of optical pump radiation. Alternatively, the perimetral optical medium may cover the entire peripheral edge of the laser gain medium.

In one preferred embodiment a plurality of hollow, tapered ducts are arranged inbetween the peripheral edge of the laser gain medium and the sources of optical pump radiation. The hollow, tapered ducts help to direct or "channel" optical pump radiation in the peripheral edge of the laser gain medium. The sources of optical pump radiation are comprised of pluralities of laser diode arrays arranged to direct optical pump radiation through the hollow, tapered ducts.

The precise shape of the laser gain medium may vary considerably, with circular, elliptical, rectangular, hexagonal, octagonal, pentagonal, heptagonal and other polygonal shapes all being possible. The perimetral optical medium may form one or a plurality of sections circumscribing the peripheral edge of the laser gain medium. The section(s) may be secured to the peripheral edge via an optically transparent bond. Various preferred embodiments of the arrangement of the optical pump sources and the laser gain medium are disclosed.

BRIEF DESCRIPTION OF THE DRAWINGS

The various advantages of the present invention will become apparent to one skilled in the art by reading the following specification and subjoined claims and by referencing the following drawings in which:

FIG. 4 is a highly enlarged view of portion 4 of the amplifier in FIG. 3;

FIGS. 5a and 5b are side cross-sectional and front views, respectively, of the composite gain medium assembly;

FIGS. 6a–6d are front views of several alternate variants of the composite gain medium assembly;

FIG. 17 is a cross-sectional view of an amplifier bank with counter-flowing coolant flows;

FIG. 21 is a cross-sectional view of an amplifier bank with repositionable optical pump sources.

DETAILED DESCRIPTION OF PREFERRED EMBODIMENT

Figure 1:
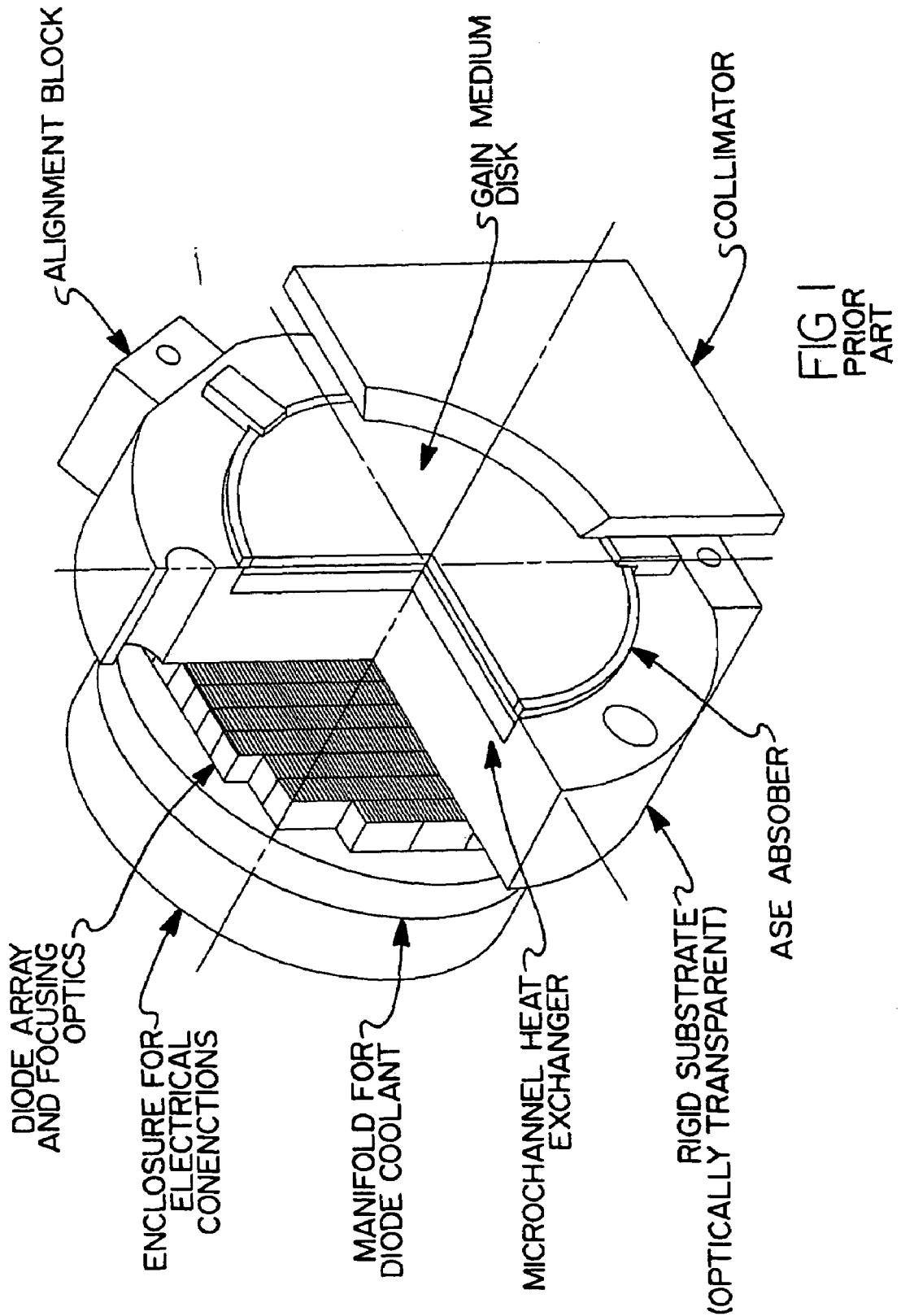
FIG. 1 is an isometric view of a prior art Active Mirror Amplifier (AMA) for high-average power.

As used herein, "Laser gain medium" refers to an optical material having a host lattice doped with suitable ions, which in the present invention are pumped to a laser transition. Although the present invention is not limited to a specific lasing material or to a specific optical pump source, the preferred host lattice materials are yttrium aluminum garnet (YAG), gadolinium gallium garnet (GGG), gadolinium scandium gallium garnet (GSGG), lithium yttrium fluoride (YLF), yttrium vanadate, phosphate laser glass, silicate laser glass, athermal glass, sapphire, and transparent polycrystalline ceramic materials. Example of a suitable ceramic host material is polycrystalline YAG available from Baikowski International Corporation. Suitable dopants for this lasing medium include Ti, Cu, Co, Ni, Cr, Ce, Pr, Nd, Sm, Eu, Gd, Tb, Dy, Ho, Er, Tm, and Yb. The optical pump source is selected based on the absorption characteristics of the selected laser gain medium. Preferably, semiconductor diode lasers are used for the optical pump source. InGaAs diodes are preferred for pumping of $Yb.sup.3+$ ions. "Perimetral optical medium" refers to an optical material which is preferably substantially free of substances that can significantly absorb optical pump radiation. Preferably, the perimetral medium is of the same host material as the laser gain medium but it is not doped., In some variants of the invention, perimetral optical medium may be doped with ions which absorb optical radiation at one or more wavelengths of the laser gain transition, but are not pumped to a population inversion. Such ions are intended for absorbing ASE photons and reducing feedback to parasitic oscillations in the laser gain medium. For a Nd laser operating near 1.06 micrometer wavelength the perimetral optical medium can be doped with either divalent samarium or divalent cobalt ions, each of which exhibits strong absorption around 1.06 micrometer wavelength and relatively low absorption at around 808 nanometer and 885 nanometer wavelengths of optical pump sources. The perimetral optical medium may be bonded to selected surfaces of the laser gain medium by a fusion bond, or diffusion bond, or other suitable means. Such bond should be mechanically strong, thermally conductive, and highly transparent at the laser wavelength as well as at pump wavelengths. The refractive index of the updoped optical medium and the bond are preferably closely matched to that of the laser gain medium. A suitable bond can be produced by fusion bonding, diffusion bonding, or optical contacting followed by heat treatment. A fusion or diffusion bond may be produced, for example, by growing a perimetral crystal onto a doped crystal boule or, in the case of glass, by casting perimetral material around the perimeter of a doped core. A method for optical contacting followed by heat treatment is, for example, disclosed by Meissner in U.S. Pat. Nos. 5,441,803, 5,563,899 and 5,846,638 and is commercially available from Onyx Optics in Dublin, Calif. Another method suitable for glass involves casting and fusion bonding doped, undoped, or differently doped sections is available from Kigre Inc., Hilton Island, S.C. Yet another method suitable for construction of composite polycrystalline materials is available from Baikowski International Corp. of Charlotte, N.C.

Figure 3:
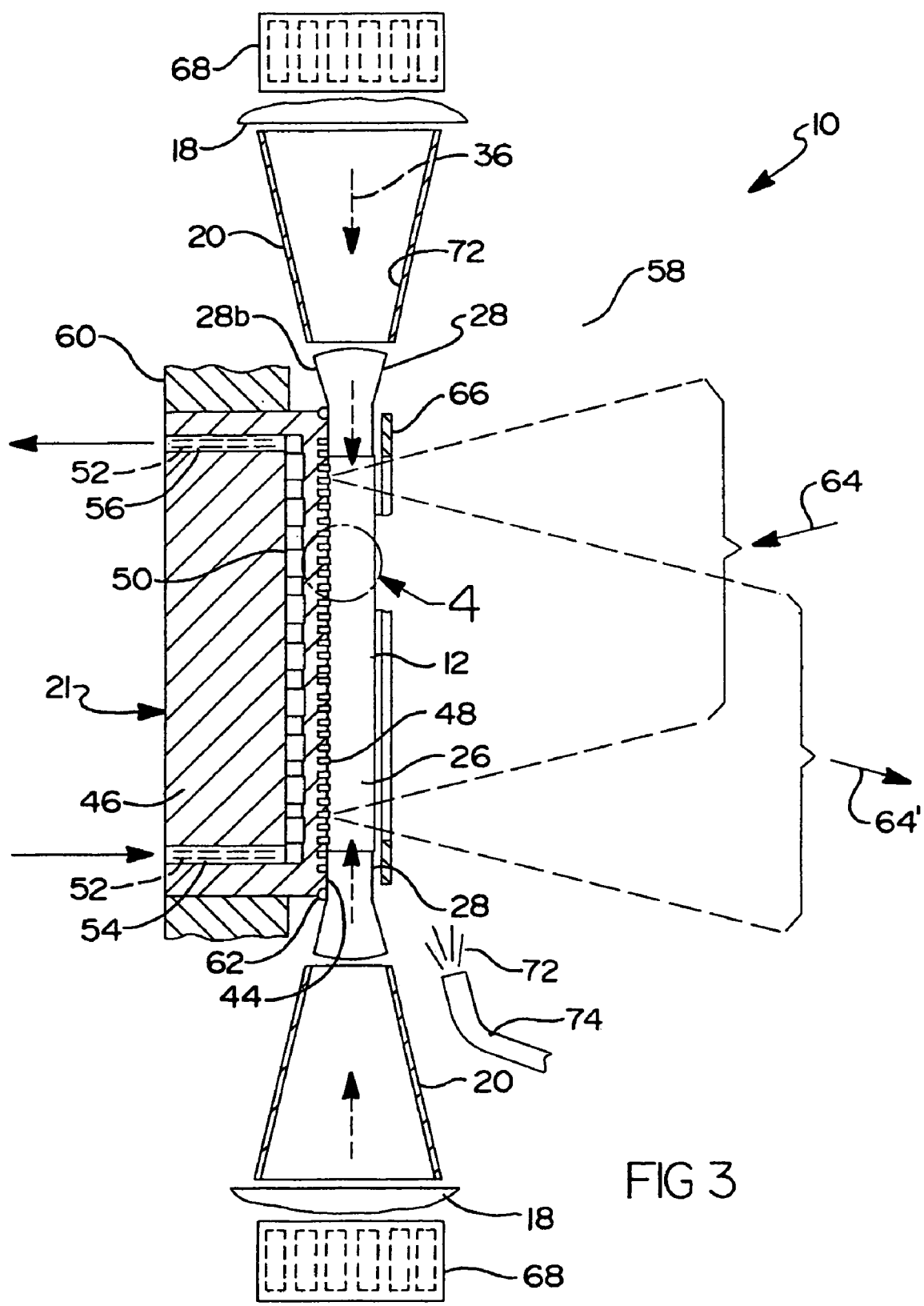
FIG. 3 is a side cross-sectional view of an active mirror amplifier module in accordance with a preferred embodiment of the present invention.
Figure 7A:
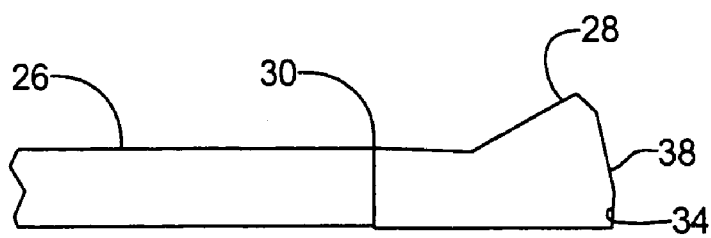
FIGS. 7a–7f are cross-sectional views of several alternative forms of perimetral optical material which can be practiced with the present invention.
Figure 7B:
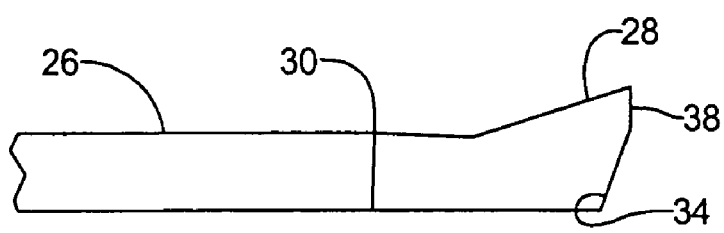
Figure 7C:
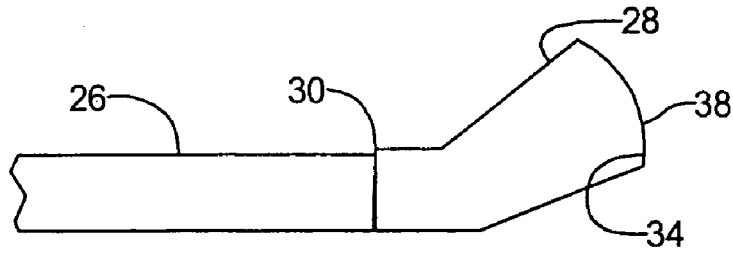
Figure 7D:
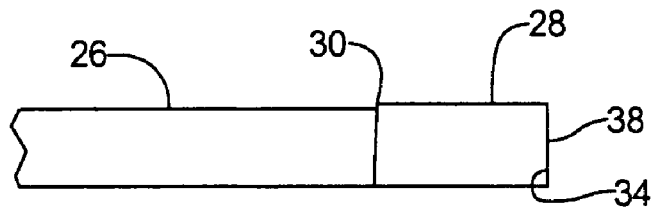
Figure 7E:
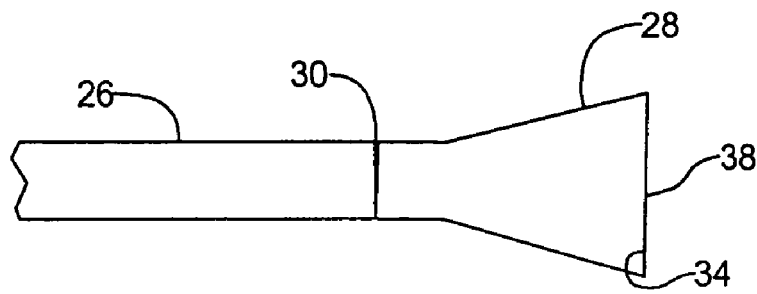
Figure 7F:
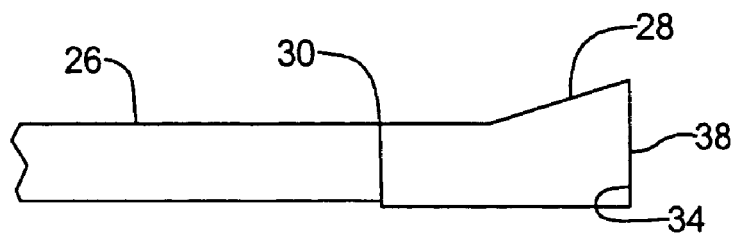

Referring to FIGS. 3 and 4, there is shown a preferred embodiment of a SSDL module 10 in accordance with a first preferred embodiment of the present invention. The module 10 generally comprises a composite gain medium assembly 12, a substrate 46, optical pump sources 68, lenses 18, and tapered hollow ducts 20. The composite gain medium assembly 12 and the substrate 46 form an active mirror assembly 21.

Referring now to FIG. 5a, the composite gain medium assembly 12 has two planar, mutually parallel surfaces, a front surface 22 and a back surface 24, both being ground flat and polished to optical quality. The shape of the composite gain medium assembly 12 may vary widely but in one preferred form comprises an octagonal disk with a transverse dimension "D" several times greater than its thickness "T", as indicated in FIG. 5a. Typically, composite gain medium assembly 12 may have a thickness ranging approximately from 1 millimeter to 10 millimeters and transverse dimensions ranging from about 10 millimeters to 300 millimeters. The composite gain medium assembly 12 could just as readily be formed in other various shapes such as (but not limited to) polygonal, circular or elliptical shapes if desired. Furthermore, while the use of the term "disk" is used herein to reference this component, it will be appreciated that the composite gain medium assembly 12 may take other forms which might not be viewed, strictly speaking, as a "disk".

Referring further to FIGS. 5a and 5b, the composite gain medium assembly 12 comprises a laser gain medium 26 and eight segments 28a of perimetral optical material 28. The material of the laser gain medium disk 26 comprises a suitable solid-state laser gain medium such as, but not limited to, neodymium-doped yttrium-aluminum garnet (Nd:YAG), erbium-doped yttrium aluminum garnet (Er:YAG), ytterbium doped-yttrium aluminum garnet (Yb:YAG), neodymium gadolinium gallium garnet (Nd:GGG), ytterbium-doped gadolinium gallium garnet (Yb:GGG), neodymium-doped glass (Nd:Glass), erbium-doped glass (Er:Glass), ytterbium-doped glass (Yb:Glass), or other suitable laser SSL material. Garnets can be provided in a single crystal or polycrystalline form. The perimetral optical medium 28 is attached around the perimeter of the laser gain medium 26 via an optical bond 30. The perimetral optical medium 28 has preferably the same host medium used in the laser gain medium 26 but does not contain a significant quantity of the dopant laser ions present in the laser gain medium 26. The optical bond 30 must be highly transparent to the optical pump radiation and laser radiation and have good thermal conductivity. Preferred methods for constructing the bond 30 include the already mentioned fusion bond, diffusion bond, and the method of optical contacting followed by heat treatment. Adjacent segments of perimetral optical medium 28 do not necessarily need to be joined together. For example, FIG. 5b shows a gap 32 existing between adjacent perimetral optical media 28a. Alternatively, some or all of the segments of the perimetral medium can be jointed to produce an optically and mechanically monolithic unit. Surfaces 34, which receive optical pump radiation 36 (FIG. 3), have a dielectric coating 38 that is antireflective at optical pump radiation wavelengths. Furthermore, the optical bond 30 plane and (FIG. 5a) can be machined at a slight angle of 1–5 degrees off normal from surface 22 to reduce the possibility of direct ASE feedback to parasitic oscillations. Alternate forms of the shape of the perimetral material 28 are shown in FIGS. 7a–7f.

Referring now to FIG. 4, the back planar surface 24 has an optical coating 40 with high reflectivity at a laser wavelength. Such a coating can be dielectric or metallic, or a combination of several layers of metallic and dielectric coatings. The front surface 22 has an optical coating 42 that is antireflective at the laser wavelength. Optionally, the coatings 40 and 42 can also be individually made reflective at the optical pump wavelength in addition to their already mentioned properties with respect to the laser wavelength. The back surface 24 is in contact with a surface 44 of a cooled, rigid substrate 46. The surface 44 contains an array of interconnected microchannels 48 extending generally over, but not beyond, the contact area between the flat portion of composite gain medium 12 and the substrate 46.

Referring further to FIGS. 3 and 4, the substrate 46 contains a heat exchanger 50 that is located below the surface 44 and not connected to the microchannels 48. Coolant 52 is provided to the heat exchanger 50 by an inlet header 54 and drained therefrom by the outlet header 56. Internal distribution of the coolant 52 inside the heat exchanger 50 is such so as to provide a uniform cooling effect over a large part of the back surface 24 of the composite gain medium assembly 12. Suitable coolants may include liquids such as water, alcohol, members from the Freon.RTM. family, and liquid nitrogen. Coolant fluid connections to the inlet header 54 and the outlet header 56 can be provided by pressure-balanced, axially-movable fluid transfer tubes such as disclosed by Eitel in U.S. Pat. No. 4,029,400, the disclosure of which is incorporated by reference herein. Such fluid transfer tubes isolate hydraulic pressure loads from the substrate 46 and coolant supply so that alignment of substrate 46 will not be affected. In addition, the fluid transfer tubes balance the hydraulic forces caused by the coolant pressure so that the substrate will not have any significant load placed upon it to interfere with its operation. Furthermore, such fluid transfer tubes permit small axial and lateral adjustments of substrate 46 such as may be required to optically align the laser gain medium 12 without affecting the operation of the fluid transfer tubes or placing forces on the substrate from the tubes.

The cooled substrate 46 is made of a material with good thermal conductivity, preferably copper, tungsten, molybdenum, sapphire, silicon carbide, silicon, but other materials with good thermal conductivity and suitable for microchannel and heat exchanger fabrication can be used. The material of the substrate 46 can also be chosen to have a coefficient of thermal expansion close to that of the laser gain medium 26. Surface 44 of substrate 46 is machined to optical flatness except for penetrations created by the microchannels 48. Typical dimensions for the microchannels 48 include a width of about 0.005 inch to 0.040 inch (0.13 mm–1 mm) and a cross sectional area of about 0.000025 inch.sup.2–0.0016 inch.sup.2 (0.00016125 cm.sup.2–0.01032 cm.sup.2). Microchannels 48 preferably occupy about 50% of the contact area between surface 44 of substrate 46 and back surface 24 of composite gain medium 12. The microchannels 48 may also be formed in a variety of cross-sectional shapes, but preferably have a generally square cross-sectional shape. The thickness of the substrate 46 is chosen to provide mechanical rigidity necessary to ensure that the surface 44 remains optically flat under operational conditions.

When optically flat surfaces are brought into contact, they may become bonded even without bonding agents. Such bonds can be attributed to Van der Vaals forces of attraction acting at opposing contact points and surfaces. Such bonding remains stable as long as the components of the composite are not subjected to temperature gradients that cause non-uniform thermal expansion, and resultant stress to overcome this bond strength. However, the bond may also be broken by inserting a strong thin object, for example a razor blade, between the optically contacted surfaces. De-bonding also results when liquids diffuse into the interface from the edge which constitutes the bond line.

In the present invention a positive contact between the back surface 24 of composite gain medium assembly 12 and surface 44 of the substrate 46 is maintained by a pressure differential between the higher pressure of the atmosphere 58 surrounding the amplifier module 10 and the lower pressure inside the microchannels 48. The microchannels 48 can be filled with either liquid (including liquid metals) or gas and are maintained at a pressure substantially lower than that of the atmosphere 58. One benefit of using liquid to fill the microchannels 48 is enhanced heat transfer due to increased thermal conductivity. The required pressure differential to maintain the surfaces 24 and 44 in contact over large portions of their areas is typically several tens of PSI. Such a continuous contact ensures that the back surface 24 will remain optically flat even when composite gain medium assembly 12 experiences significant thermal load. The continuous contact between surface 24 and surface 44 further facilitates the conductive transfer of heat from the gain medium assembly 12 to substrate 46. The substrate 46 may be further installed in an optical mount 60 to facilitate easy positioning and alignment.

Apart from the contact between the optically flat surfaces 24 and 44, which in itself provides a good seal, the atmosphere 58 can be further sealed from the microchannels 48 by an elastomeric seal 62 between the perimeter of the contact surface of composite gain medium assembly 12 and the surface 44. Seal 62 may also hold the composite gain medium assembly 12 to the substrate 46 in the absence of a pressure differential, such as during non-lasing conditions. Using a compliant seal in this area also avoids restraining of the composite gain medium assembly 12 from thermal expansion during lasing and reduces thermal stresses therein. Suitable materials for the elastomeric seal 62 include RTV.RTM. silicon rubber. Other forms of compliant seals such as an O-ring may also be used. Thermal dSSDLge to the seal 62 potentially caused by a misalignment of incident laser beam 64 (FIG. 3) is prevented by a collimator 66, which preferably absorbs laser radiation incident on the edge of the laser gain medium 26. The collimator 66 may incorporate suitable cooling means to dissipate absorbed heat. Seal 62 is preferably protected from optical pump radiation 36 by extending the high-reflectivity optical coating 40 to cover at least that portion of the perimetral optical medium 28 which is in contact with the seal 62.

Referring further to FIGS. 3 and 4, during lasing, optical pump source 68, which preferably comprises an array of laser diodes, produces and directs optical pump radiation 36 into cylindrical lenses 18. The cylindrical lenses 18 focus the radiation into the converging hollow ducts 20. Internal surfaces 72 of the ducts 20 are made highly reflective to the optical pump radiation. Aided by reflections from surfaces 72, the optical pump radiation 36 gradually increases in intensity as it progresses towards the tapered end of the duct 20. Optical pump radiation 36 exiting the tapered end of the duct 20 enters the perimetral optical medium 28 and it is transmitted therethrough into the laser gain medium 26. Tapered portion 28b (FIG. 5a) of the perimetral optical medium 28 acts as a continuation of the duct 20 and further concentrates and channels pump radiation into the laser gain medium 26. Upon entering laser gain medium 26, pump radiation is channeled in a direction generally parallel to the surfaces 22 and 24 by multiple internal reflections therefrom. During passage through the laser gain medium 26, the optical pump radiation 36 is gradually absorbed. This absorption process follows Beer's law: I(x)=I.sub.0 exp(−ax), where "x" is the distance into absorbing medium, "a" is the absorption coefficient, "I.sub.0" is the initial intensity of pump radiation, and "I(x)" is pump radiation intensity after traveling distance "x" in the absorbing medium. Preferably, the material of laser gain medium 26 is doped with absorbing species so that 90% or more of incident pump radiation 36 is absorbed in the laser gain medium 26.

Optical radiation 36 absorbed by dopant species in laser gain medium 26 pumps the dopant species to a laser transition. This allows the laser gain medium 26 to serve as an amplifier of coherent optical radiation. The incident laser beam 64, having approximately the same footprint as the aperture in the collimator 66, is directed into the laser gain medium 26 at a generally normal incidence through front surface 22 and is amplified until it reaches the reflective coating 40. On reflection from coating 40, the laser beam passes through the laser gain medium 26 again but in a generally reverse direction. The amplified laser beam 64' exits the laser gain medium 26 in a direction generally normal to the front surface 22. Waste heat dissipated in the laser gain medium 26 is conducted to the back surface 24, through the optical coating 40, and transferred to surface 44 of the substrate 46 from which it is conducted to the heat exchanger 50. Since the front surface 22 of the laser gain medium 26 is operating at above ambient temperature, it heats the surrounding atmosphere 58. This can lead to formation of pockets of warm atmosphere and/or eddy currents in the atmosphere 58. As a result, the laser beam 64 can experience a variation of its optical path and its optical phase fronts could be perturbed. This situation can be prevented by flowing a stream of gas from atmosphere 58 over the front surface 22, thereby sweeping the pockets of warm atmosphere from the front surface 22 and preventing the pockets from accumulating and/or forming eddy currents. A suitable stream of gas 72 can be generated, for example, by a gas jet 74 shown in FIG. 3, or by other suitable means.

The perimetral optical material 28 serves several functions:

1) Transport of pump radiation: Perimetral optical medium 28 receives concentrated optical radiation 36 from the tapered end of duct 20 and channels it into the laser gain medium 26. In this respect, the perimetral optical material 28 serves as a continuation of the duct 20. Surface 34 of material 28 can be curved to provide an additional lensing effect.

2) Thermal management of perimeter of the laser gain medium 26: The perimetral optical material 28 is in good thermal contact with the laser gain medium 26 and provides a heat conduction path to substrate 46. This allows it to draw heat away from the perimeter of the laser gain medium 26 which reduces thermal stresses and distortions therein.

3) Suppression of parasitic oscillations: The perimetral optical medium 28 is preferably chosen to have an index of refraction closely matching that of laser gain medium 26. This allows ASE rays to cross the boundary between the two materials without significant refection. The shape of the perimetral optical medium 28 can be chosen so as to trap such ASE rays and/or channel them outside the composite gain medium assembly 12. By so reducing the feedback of ASE rays from the boundary of composite gain medium assembly 12, the feedback mechanism for parasitic oscillations is largely eliminated and oscillations can be suppressed. As already noted above, in some forms of the invention, the perimetral optical medium 28 can be doped with ions that are absorbing at a laser gain wavelength but not significantly absorbing at optical pump wavelengths. Absorption of ASE rays in the perimetral optical medium 28 accelerates their decay.

FIGS. 6a–6d show examples of alternate constructions of the composite gain medium 12. FIGS. 6c and 6d use two layers of perimetral optical media 28 and 28'. This allows each of the perimetral optical media 28 and 28' to be either undoped or doped differently with ASE absorbing ions.

Figure 2:
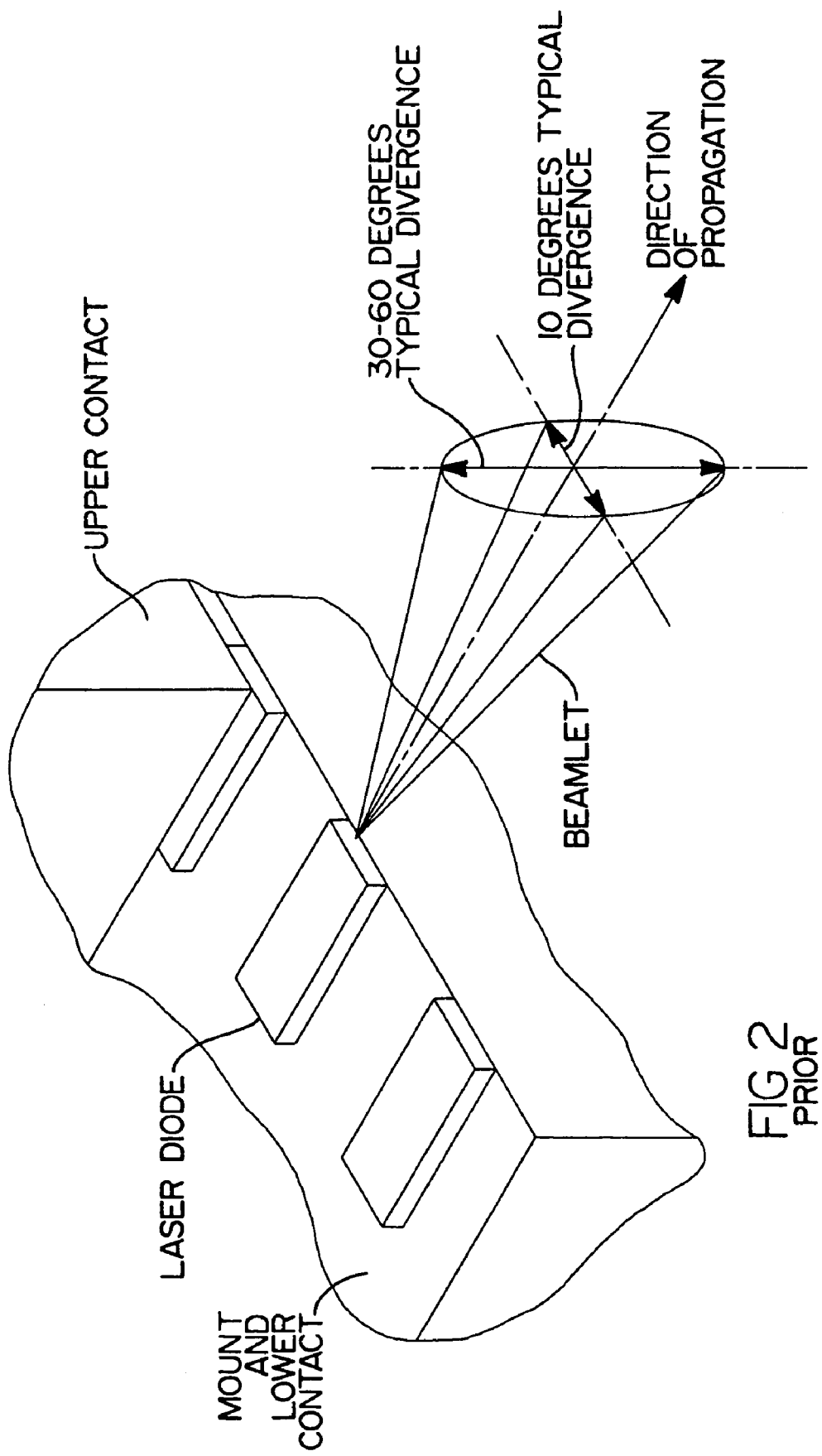
FIG. 2 is an isometric view of a prior art laser diode illustrating the divergence of a beamlet produced thereby.
Figure 8:
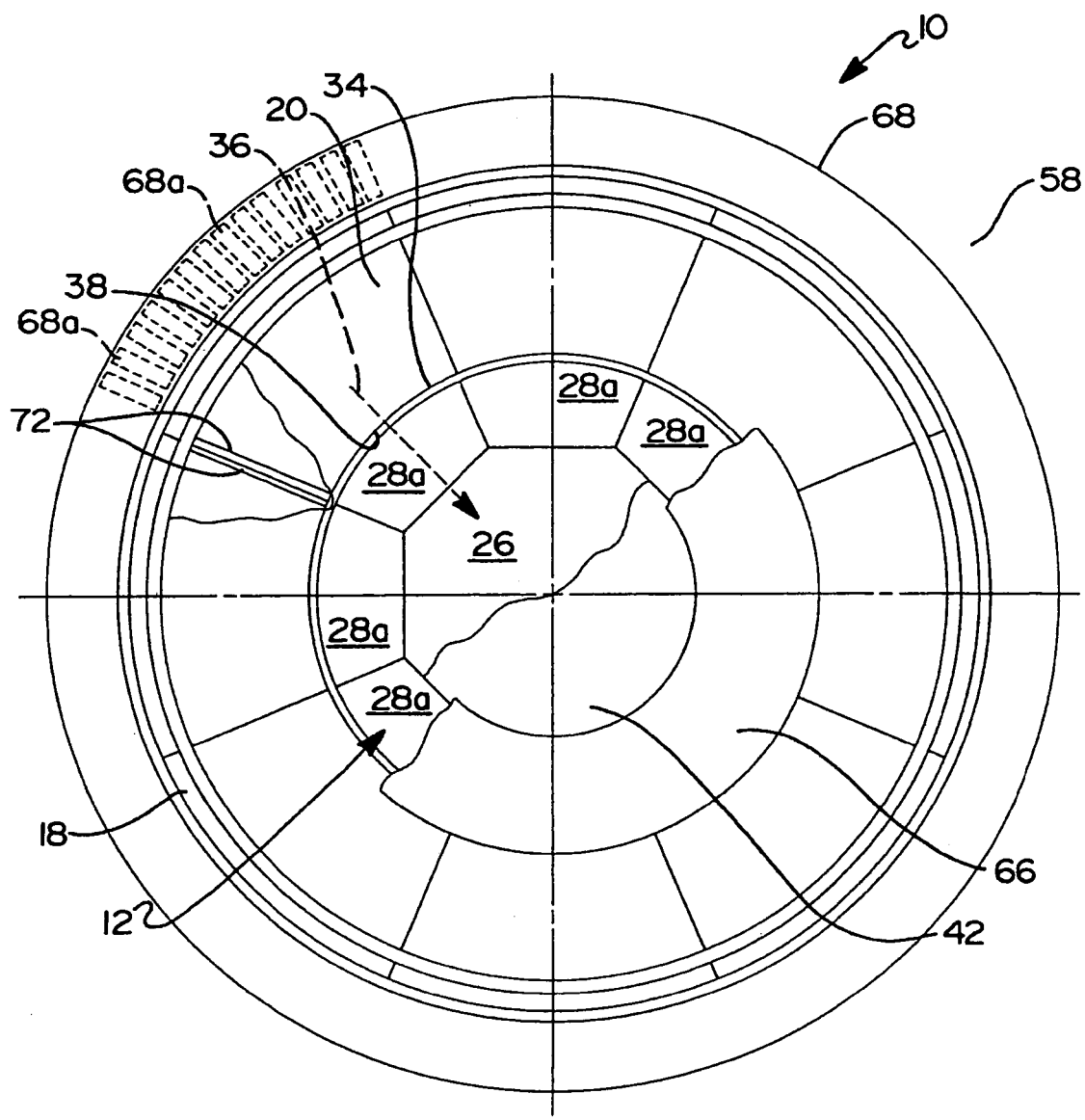
FIG. 8 is a front view of the active mirror amplifier module of the present invention.

FIG. 8 is a front view of the amplifier module 10 showing optical pump source 68, lenses 18, and tapered hollow ducts 20 providing optical pump radiation 36 into the composite gain medium assembly 12 with octagonal doped laser gain medium 26. The circular arrangement of pump source 68 is produced by placing laser diode arrays 68a so as to generally point toward the center of laser gain medium 26. This pump source arrangement makes it possible to achieve laser gain that is uniform across large portions of the laser gain medium 26. Beamlets produced by individual laser diode elements (as for example shown in FIG. 2) in optical pump source 68 overlap inside the laser gain medium 26 and their intensities are summed. The resulting intensity of overlapped beamlets depends on the power output and beamlet divergencies of individual diode elements of each diode array 68a, the distance of the diode elements from the center of the laser gain medium 26, parameters of the lens 18 and the duct 20, the doping density of laser gain medium 26 and the radial position (with respect to the center of laser gain medium 26) of the location where the intensity is measured.

It is a principal advantage of the present invention that a uniform gain profile is produced in the laser gain medium 26 across the aperture defined by the collimator 66. This is accomplished by choosing an appropriate combination of beamlet divergencies of individual diode elements in optical source 68, by the distance of the diode elements of each diode array 68a from the center of the laser gain medium 26, by the parameters of the lens 18 and the duct 20, and by the doping density of laser gain medium 26. Suitable methods for producing a tailored gain profile in a side-pumped SSDL are disclosed in Applicant's U.S. patent application Ser. No. 10/441,373 filed on May 19, 2003, which is hereby incorporated herein by reference.

Figure 9A:
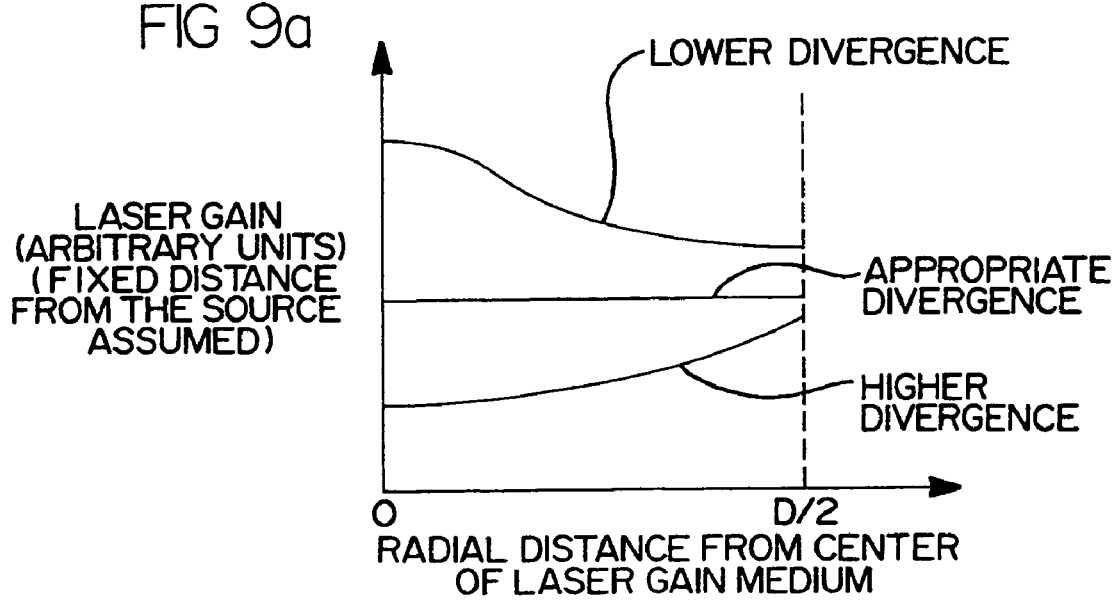
FIGS. 9a and 9b are graphs illustrating how the radial variation of small-signal gain is affected by choices of diode divergence and diode distance from the axial center of the laser gain medium.
Figure 9B:
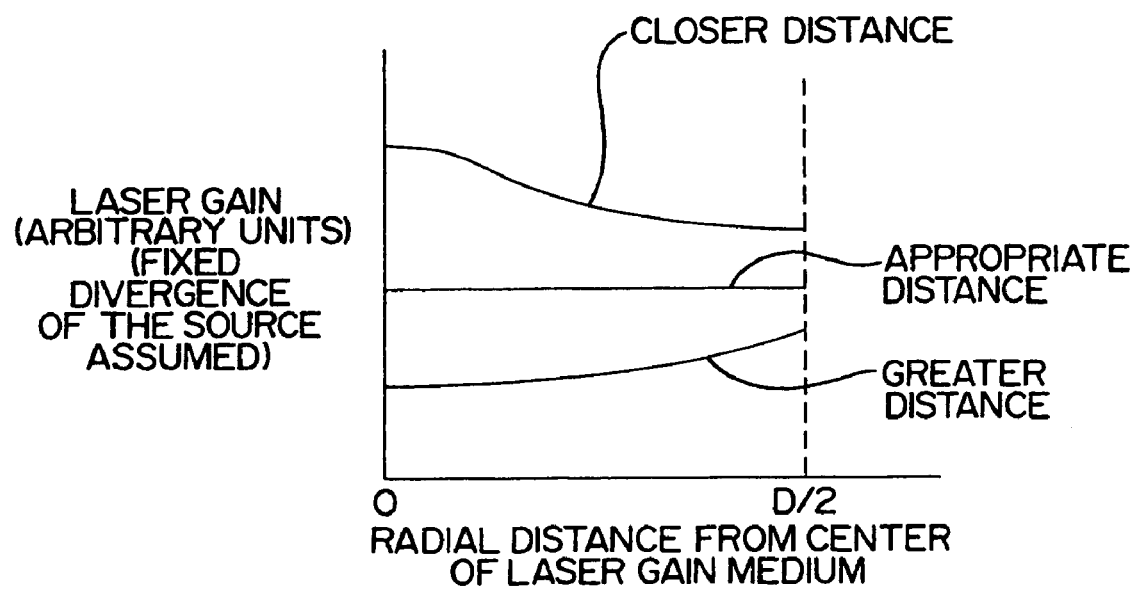

FIGS. 9a and 9b show examples of how the radial variation of small-signal gain is affected by choices of divergence of optical pump sources 68 (in the plane parallel to surface 22) and the distance of optical pump sources 68 from the center of laser gain medium 26. Besides producing a uniform small-signal gain across the aperture, the present invention can also be used to provide nearly uniform gain when the medium is saturated. For example, when the invention is used to amplify laser beams with higher intensity in the central portion of the beam, the gain saturation effects near the beam center can be countered by appropriately increasing the pumping intensity (and hence small-signal gain) near the center of laser gain medium 26. Specific examples of arrangements of optical pump sources and associated choices of divergence are presented in John Vetrovec, "Compact Active Mirror Laser (CAMIL)," SPIE volume 4630, 2002, and in John Vetrovec et al., "Development of Solid-State Disk Laser for High-Average Power," in SPIE vol. 4968, 2003, both of which are hereby incorporated by reference.

An alternate version of the first preferred embodiment of the SSDL of the present invention is suitable for operation at increased optical power density. Referring again to FIGS. 3 and 4, in the alternative embodiment, the internal heat exchanger 50 inside substrate 46 can be omitted and the coolant 52 is provided to microchannels 48 and allowed to directly wet large portions of the back surface 24 of the composite gain medium assembly 12. In this fashion, heat generated in the laser gain medium 26 is conducted through the surface 24 and the optical coating 40 directly into the coolant 52. Coolant 52 is introduced into the microchannels 48 to provide a uniform cooling effect over a large portion of the back surface 24 of the gain medium assembly 12. The pressure of coolant 52 is maintained lower than the pressure of atmosphere 58 to assure attachment of composite gain medium assembly 12 to substrate 46 as already explained above.

Figure 10:
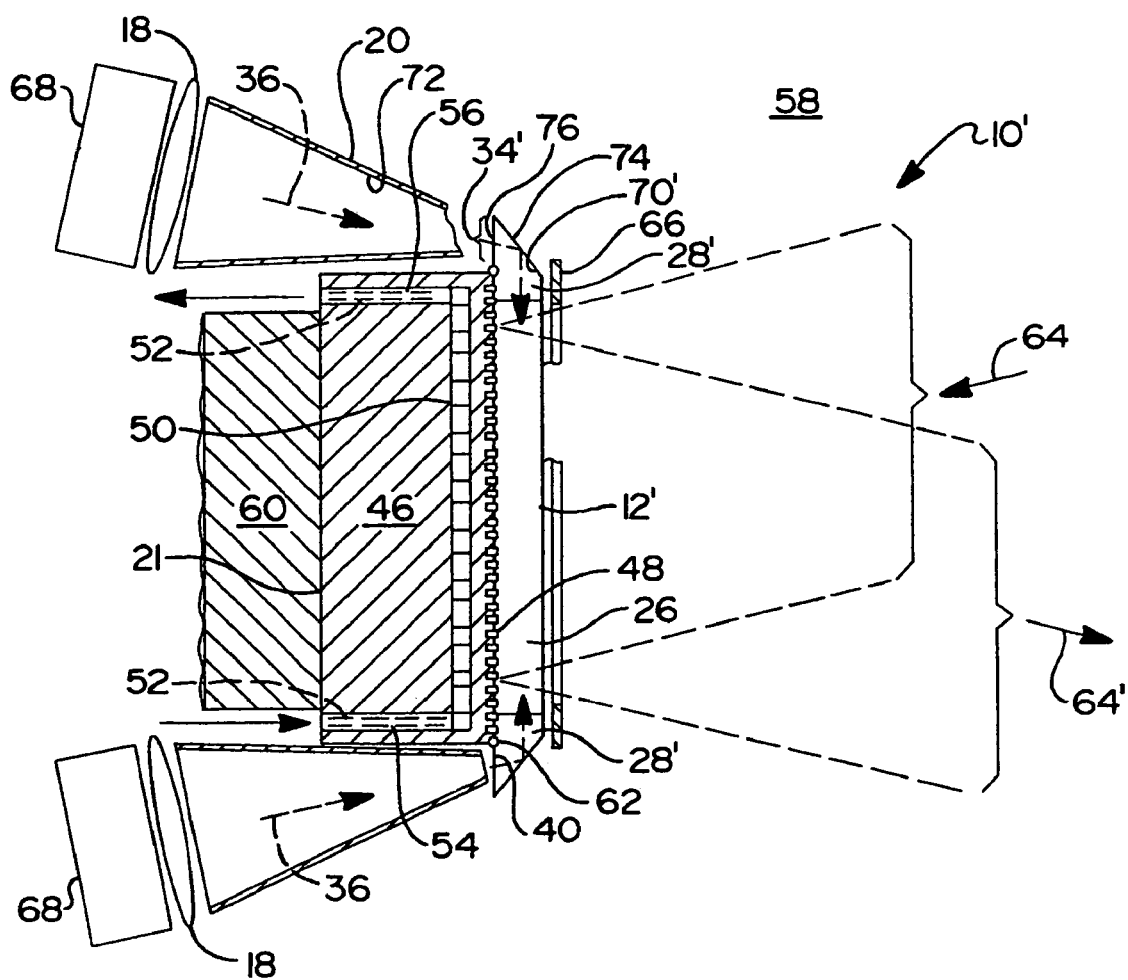
FIG. 10 is a cross-sectional view of an alternative preferred embodiment of the active mirror amplifier module of the present invention which is especially suitable for tight packaging.

Yet another alternative to the first preferred embodiment of the SSDL of the present invention that is suitable for tight packaging is shown in FIG. 10. FIG. 10 shows an active mirror amplifier module 10' wherein the optical pump sources 68 and the tapered hollow ducts 20 are mounted in closer proximity to the substrate 46 and optical mount 60. The composite gain medium assembly 12' incorporates perimetral optical medium 28' having a surface 70' at approximately a 45 degree angle with respect to the surface 24 (FIG. 5a) of the gain medium assembly 12'. The surface 70' has a coating 74 which is highly reflective at the optical pump radiation wavelengths. Surface 34' of the perimetral optical medium has a coating 76 which is antireflective at the optical pump radiation wavelengths. Optical pump radiation 36 is injected into the surface 34' and reflected from coating 74 into the laser gain medium 26.

Figure 11:
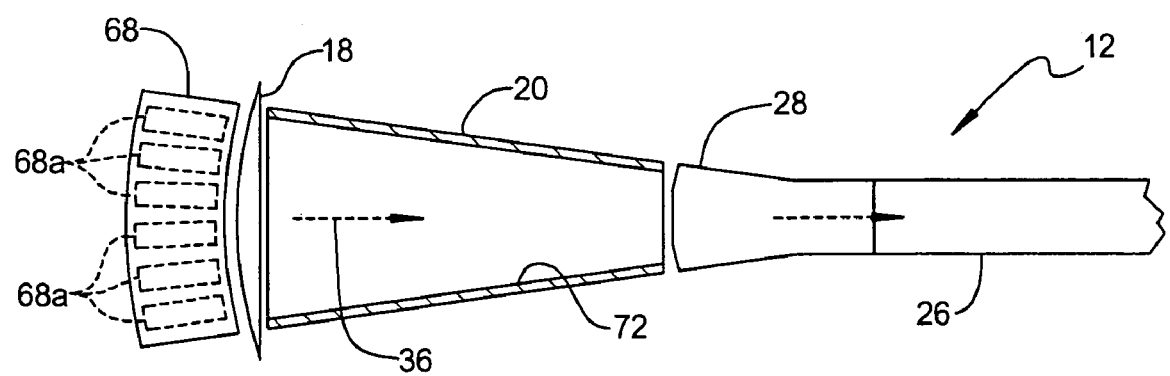
FIG. 11 is an edge view illustrating the stacking of a plurality of laser diode arrays of pump source for improved delivery of optical pump radiation into the composite gain medium.

The efficiency of concentrating pump radiation in duct 20 can be further improved by stacking laser diode arrays 68a in the plane of pump source 68 to directly point toward the surface 34 of the composite laser gain medium assembly 12 as shown in FIG. 11. This configuration of the pump source 68 also reduces the need for the lens 72 so that the lens can be omitted from the system. Furthermore, the invention can also be practiced with a solid material lensed duct such as disclosed by Beach et al. in U.S. Pat. No. 5,307,430 in lieu of the hollow duct 20. Experience shows that owing to the higher index of refraction, a solid material lensed duct can be more efficient for concentration of pump radiation. However, one drawback of the solid lensed duct in high-average power applications is that low thermal conductivity of the solid duct material (typically optical glass) makes it difficult to remove heat generated therein by pump radiation. If optical pump sources 68 of sufficient intensity are used, then the need for the concentrator duct 20 is eliminated.

Figure 12:
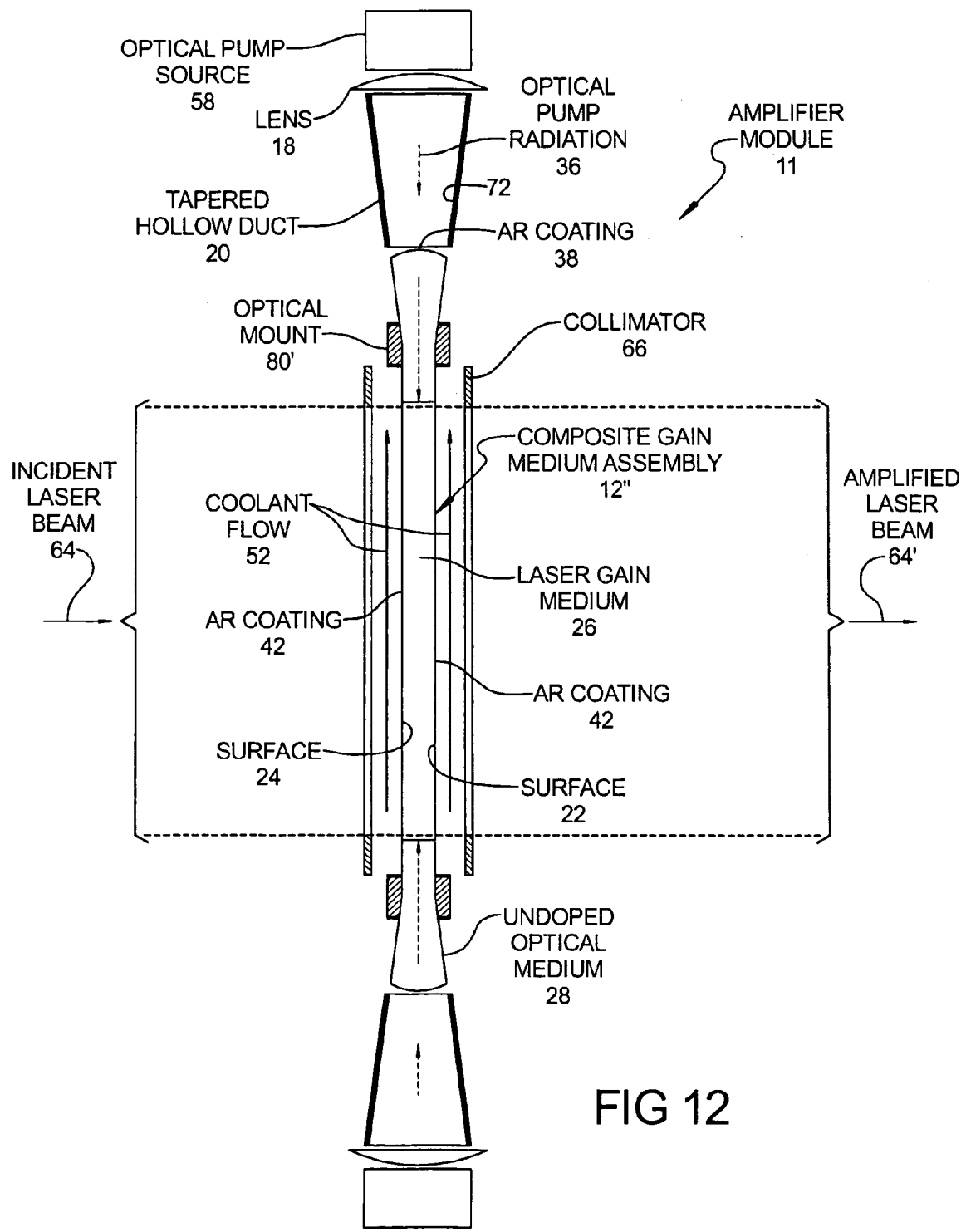
FIG. 12 is a side view of an alternative preferred embodiment of the present invention that does not incorporate a substrate with cooling channels.

The invention can also be practiced with a transmissive laser gain medium disk (rather than reflective disk in AMA configuration) and without the substrate 46. Referring now to FIG. 12, there is shown a SSDL amplifier module 11 in accordance with a second preferred embodiment of the present invention. The module 11 generally comprises a composite gain medium assembly 12", optical pump sources 68, lenses 18, and tapered hollow ducts 20. The composite gain medium assembly 12" is essentially the same as the composite gain medium assembly 12, except that both surfaces 22 and 24 now have the optical coating 42 which is antireflective at a laser gain wavelength. The composite gain medium assembly 12" is preferably suspended by the perimetral optical medium 28, which is supported by optical mount 60'.

The laser gain medium 26 is pumped to a laser transition by the optical pump sources 68 in the same manner as in the SSDL amplifier module 10. This allows the laser gain medium 26 to serve as an amplifier of coherent optical radiation. The incident laser beam 64, having approximately the same footprint as the aperture in the collimator 66, is directed into the laser gain medium 26 at a generally normal incidence through surface 24 and is amplified. The amplified laser beam 64' exits the laser gain medium 26 in a direction generally normal to the surface 22. It should be appreciated that the amplifier module 11 can be also practiced (i.e., positioned) at a Brewster angle with respect to the incident laser beam 64. In this case, the antireflection coating 42 on surfaces 22 and 24 can be omitted.

Waste heat dissipated in the laser gain medium 26 is conducted to both surfaces 22 and 24, through the optical coating 42, and transferred to coolant 52 flowing generally parallel to the surfaces 22 and 24. The coolant 52 and its flow conditions should be chosen so as to permit a high heat transfer rate while avoiding perturbation to the optical phase front and scattering losses of the laser beams 64 and 64'. A preferred coolant is gaseous helium, although any other suitable coolant could be employed. Experiments with nitrogen and helium flows at subsonic velocities have shown that heat transfer rates on the order of several watts/cm$^2$ can be achieved at subsonic flow conditions around Mach 0.2 (see for example S. B. Sutton et al., "Thermal Management in Gas Cooled Solid-State Disk Amplifiers," UCRL-JC-109280, which can be obtained from the technical library of the Lawrence Livermore National Laboratory.

Figure 13:
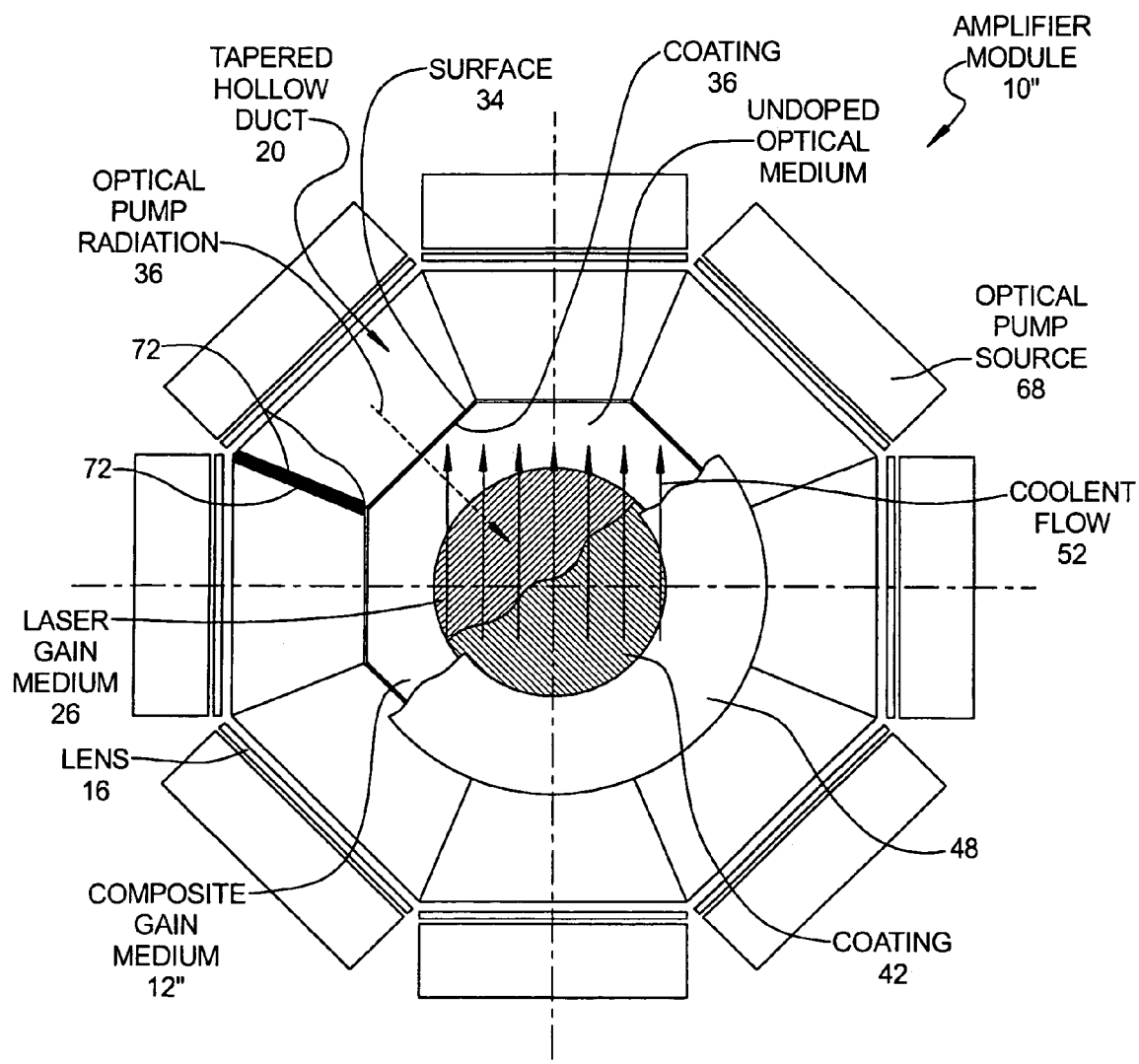
FIG. 13 is a front view of the laser module of FIG. 12.

FIG. 13 is a front view of the amplifier module 11 showing optical pump sources 68, lenses 18, and tapered hollow ducts 20 providing optical pump radiation 36 into the composite laser gain medium assembly 12". The laser gain medium assembly 12" has circular doped laser gain medium 26 and octagonal perimetral edge 28. The octagonal arrangement of pump sources 68 is produced by placing one or more laser diode arrays 68a at each edge of the octagon so as to generally point toward the center of laser gain medium 26. This pump source arrangement makes it possible to achieve laser gain that is uniform across large portions of the laser gain medium 26 (see, for example, J. Vetrovec, "Progress in the Development of Solid-State Disk Laser," in proc of the 16$^{th}$ Annual Solid-State and Diode Laser Technology Review, May 20–22, 2003, Albuquerque, N. Mex., paper no. HPAPP-6). It should be appreciated that the arrangement of diode sources 68 and the perimeter of perimetral medium 28 could have other polygonal shapes, or be generally circular as shown for example in FIG. 7, and as noted above. Furthermore, a laser gain medium 26 with a polygonal perimeter can be practiced with a perimetral medium of a different shape (namely circular or elliptical) and conversely, or they can both have the same general shape. An alternate configuration of the SSDL amplifier 11 that uses higher intensity optical pump sources 68 can be practiced without the lens 18 and hollow duct 20.

The SSDL amplifiers 10, 10' and 11 of the subject invention can be operated in a thermally continuous mode where the heat deposited into the laser gain medium 26 is removed in real time by coolant 52, or in a semi-continuous heat capacity mode where the laser gain medium 26 is allowed to gradually warm up to a predetermined limiting temperature. A solid-state laser operating in the "heat capacity laser", has been disclosed by Albrecht et al. in U.S. Pat. No. 5,526,372. In the heat capacity mode, prior to laser operation, the laser gain medium 26 is cooled to an initial operating temperature. During laser operation, the laser gain medium 26 gradually warms up until it reaches its final operating temperature. At that point the laser operation is suspended and the laser gain medium 26 is allowed to cool again to its initial operating temperature by transferring its stored heat to the coolant 52. After reaching this temperature, the process can be repeated. In this fashion, the laser can be operated in a semi-continuous fashion. The length of the laser cycle depends on the rate at which waste heat is deposited into the laser gain medium, the weight and specific heat (cp) of the laser gain medium and the allowable temperature rise. The length of the cooling cycle depends on the effectiveness of the cooling applied to the laser gain medium. When the SSDL amplifier module 10, 10' or 11 operates in the heat capacity mode, the heat can be extracted from the laser gain medium 26 during laser in operation at a much slower rate than the deposition rate during laser operation.

Figure 14:
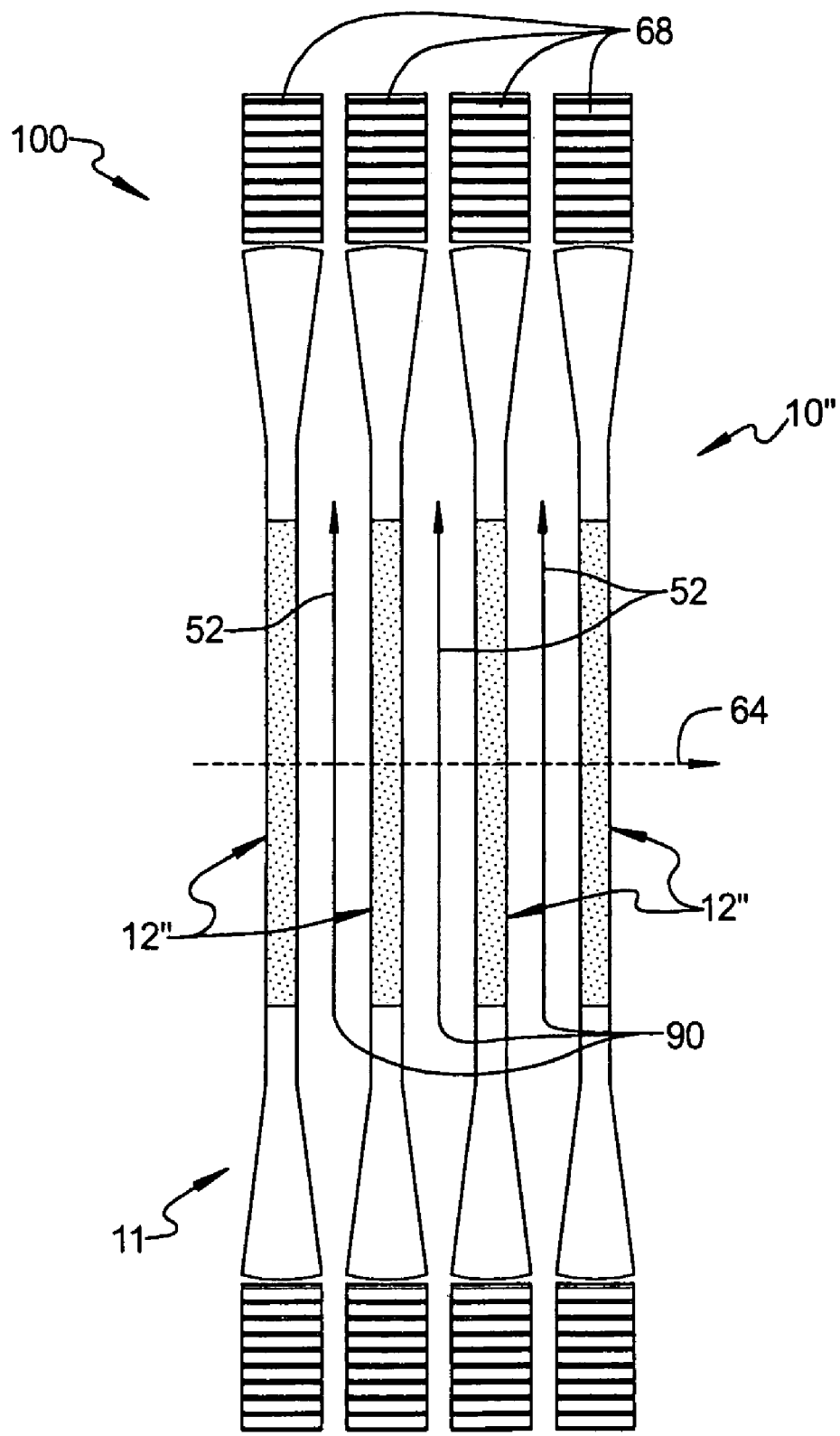
FIG. 14 is a cross-sectional view of a plurality of laser gain mediums ganged in parallel in a bank and forming flow channels therebetween.

Any one of the SSDL modules 10, 10', and 11 or variants thereof can be used to construct laser amplifiers as well as laser oscillators. In either case, multiple SSDL modules are required to obtain required laser gain and laser power. Boeing owned U.S. Pat. No. 6,603,793 discloses how SSDL modules in a AMA configuration (e.g., 10 and 10') can be arranged in a laser device. FIG. 14 shows how SSDL modules 11 using transmissive composite gain medium assemblies 12" can be used to construct an amplifier bank 100. Several composite gain media 12" and associated optical pump sources 68 are placed adjacent to each other thereby forming between them passages (flow channels) 90 for flowing a cooling medium 52. The spacing between adjacent composite gain medium assemblies 12" and the width of flow channels 90 are approximately of the same magnitude as the thickness of each gain medium assembly 12". The size of such spacing depends on the design of the perimetral optical medium 28 and the optical pump source 68. In practice, such spacing preferably ranges from about 1 to 10 millimeters. The cooling medium in adjacent channels 90 can be flowed in the same or in opposite directions. Although the latter approach somewhat complicates the coolant medium delivery and recovery routing, it greatly reduces the transverse component in temperature gradient inside the gain medium 26 and makes it much easier to maintain alignment and beam quality of the laser beam 64.

Figure 15:
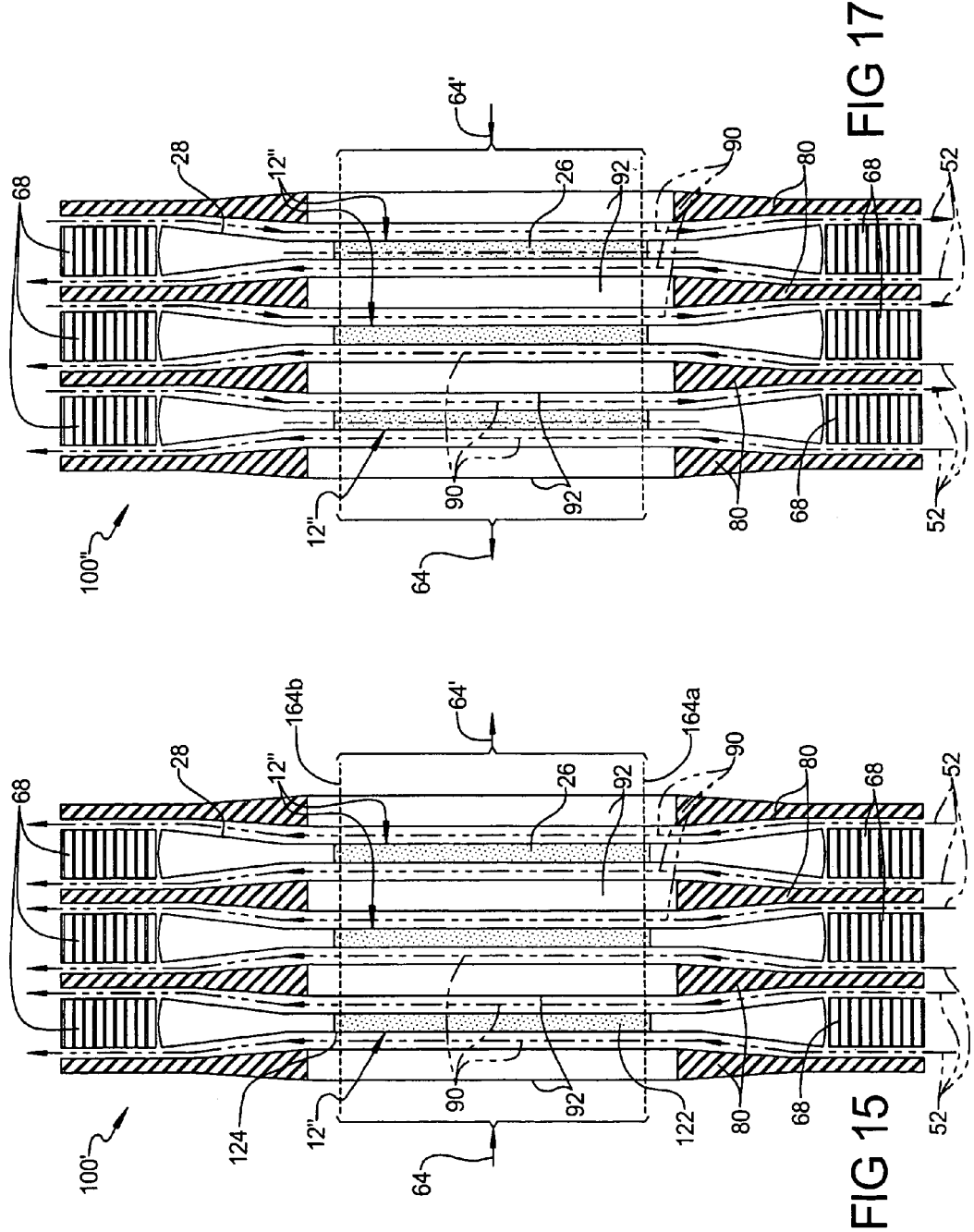
FIG. 15 is a cross-sectional view of a plurality of laser gain mediums ganged in parallel in a bank and having spacers therebetween to form narrow flow channels.

FIG. 15 shows an SSDL amplifier bank 100' that reduces flow requirements for coolant medium 52. Here the spacing of adjacent composite gain medium assemblies 12" is approximately the same as in the configuration shown FIG. 14. However, spacers 92, mounted on holders 80, are installed in the gap between adjacent composite gain medium assemblies 12", thereby reducing the width of the flow channel for coolant medium 52. The preferred width of the coolant channels 90' is approximately in the range from 0.5 to 2.0 millimeters. The resulting reduction in coolant medium flow rates allows using a smaller coolant flow system including smaller sizes of the pumps, storage tanks, and piping. Spacers 92 are each preferably of the same thickness and made of the same material as the host material for the gain medium 26 and do not contain ions for lasing at the laser wavelength of the gain medium 26. Alternatively, the spacers 92 can be made of a thermal optical material that offers low thermo-optic distortion. Furthermore, spacers 92 each preferably have an anti-reflective coating on both large faces to avoid excessive loss of power in laser beam 64 by reflection.

When the amplifier module 100' is operated in a heat capacity mode, spacers 90 provide additional reservoirs for heat storage. Efficient transfer of heat from each composite laser gain medium assembly 12" to its associated spacer 90 is made possible by flowing the coolant 52 through a narrow passage 90. Heat storage capacity of spacers 90 can be increased by appropriately increasing their thickness.

Coolant 52 flowing in passage 90 removes heat from the composite laser gain medium assembly 12" and gradually warms up. As a result, down stream portion 124 of the composite laser gain medium assembly 12" is considerably higher in temperature than the upstream portion 122. Temperature affects both the index of refraction and thermal expansion of the laser gain medium 26, each in turn affecting the length of optical path through the medium. In the amplifier module 100', coolant 52 in adjacent gaps 90 flows in the same direction. As a result, the optical path of the rays near the edge 164a of laser beam 64 is significantly different than the optical path of the rays near the edge 164b. This causes an optical path difference (OPD) and perturbation to the optical phase fronts of laser beam 64.

Figure 16:
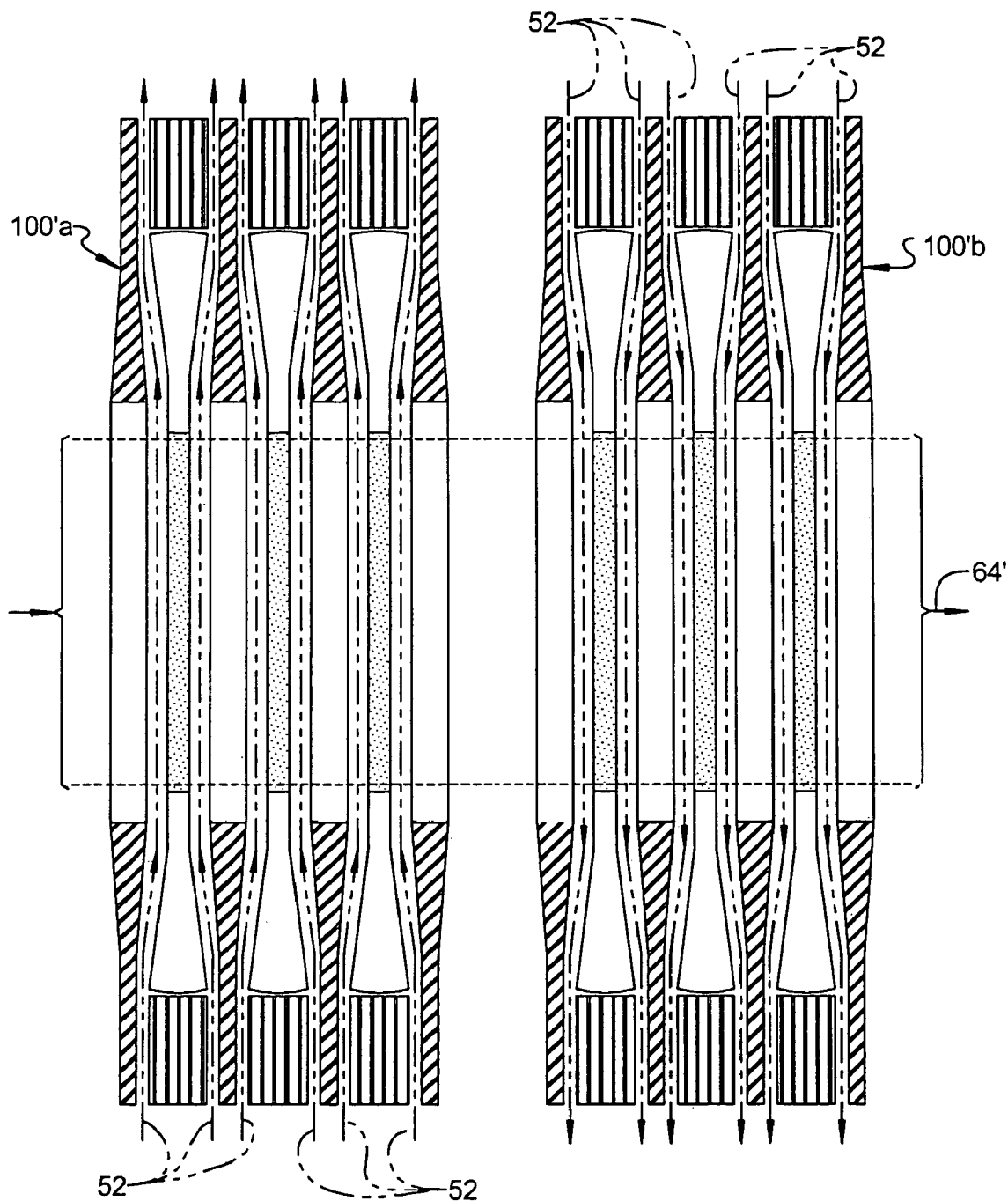
FIG. 16 is a cross-sectional view of two amplifier bank arranges to reduce thermal distortion to the laser beam.

FIG. 16 shows an arrangement of two amplifier modules 100'a and 100'b having their respective coolants 52 and 52' showing in opposite directions. This arrangement significantly reduces thermal distortion caused by coolant temperature rise. Another approach for mitigation of the OPD resulting from coolant temperature rise is to counter-flow the coolant. FIG. 17 shows an amplifier module 100" where the coolant in adjacent passages 90 is flowed in opposite directions.

Another type of perturbation to the temperature profile in the laser gain medium 26 is caused by non-uniform deposition of optical pump radiation 36. Computer simulations and laboratory testing performed by the applicant indicates that such perturbations acquire spatial distribution patterns that are related to the arrangement of optical pump sources 68 around the perimeter of composite gain medium. For example, if optical pump sources 68 are arranged in octagonal configuration such as shown in FIG. 14, the pump density distribution in the laser gain medium 26 can be expected to have at least slight spatial non-uniformities that form a generally octagonal pattern. Although the OPD caused by this effect in a single composite gain medium assembly 12" is typically a small fraction of laser wavelength, contributions from multiple disks can sum up to a very significant distortion of optical phasefront. It is well known that random but correlated error contributions add up arithmetically. In particular, if $\epsilon$ is a random statistical error experienced by laser beam 64 in each laser gain medium 26, passage of the beam through N of such laser gain media having mutually correlated errors will result in a total (cumulative) phase front error $\epsilon_N = N\epsilon$.

Cumulative phase error can be greatly reduced by reducing the correlation of individual error contributions. In the amplifier module 100, 100', and 100", errors in individual composite gain medium assemblies 12" operated with optical radiation sources 68 arranged in polygonal arrays (such as shown in FIG. 13) can be at least partially de-correlated by slightly rotating (clocking) about the laser beam 64 each polygonal array with respect to its neighbor. For example, if three octagonal arrays of optical radiation sources 68 (see e.g., FIG. 13) in amplifier module 100', each array should be clocked by preferably about 15 degrees with respect to each other. In particular, the first array is clocked by 0 degrees, second array by 15 degrees, and the third array by 30 degrees. If laser beam 64 encounters random errors $\epsilon$ in each laser gain medium 26, passage of the beam through N of such laser gain media having completely de-correlated errors will result in a total (cumulative) phase front error $\epsilon_N = N^{1/2}\epsilon$.

The correction of a distorted phase front in laser beam 64' can also be achieved by passing the distorted laser beam through a phase corrector 174. The phase corrector 174 is an optical element with one or more surfaces machined to reverse the effects of OPD in amplifier module 100.

Coolant 52, for operation of the amplifier modules 11, 100, 100' and 100", can be provided by a closed or open coolant supply loop. If the coolant flow passage 90 is made sufficiently narrow (preferably 0.5 to 1.0 millimeters) the coolant flow rate required to operate the amplifier module is rather modest. For example, a flow of helium at Mach 0.2 used for cooling composite gain medium 12' with a 10-cm diameter laser gain medium 26 and a 0.5-millimeter wide flow passage can extract heat from the laser gain medium at a rate of around 5 Watts per centimeter square. This translates to a flow of 14 standard liters per second per flow passage.

Figure 18:
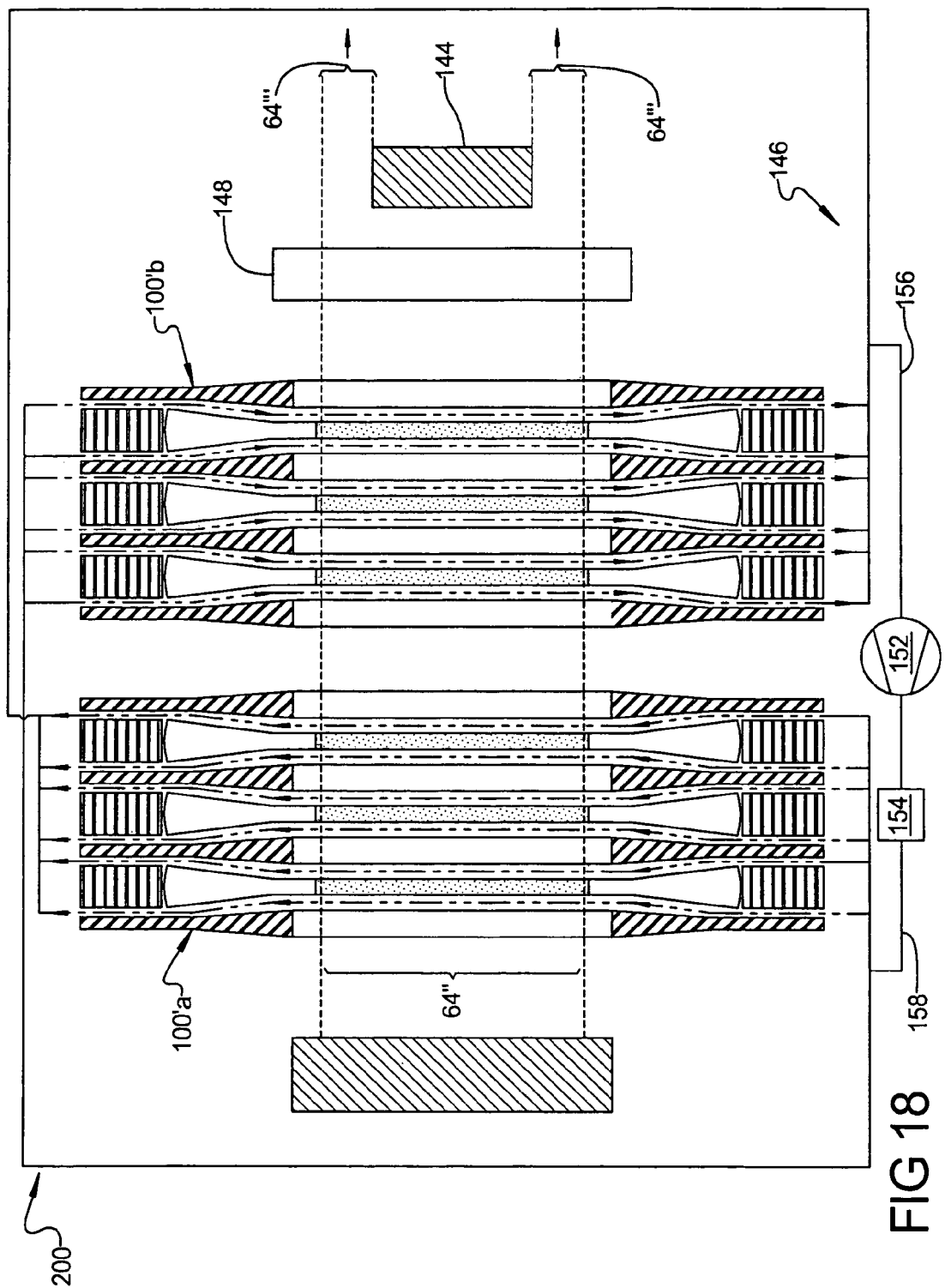
FIG. 18 is a cross-sectional view of a laser device with a closed coolant loop.

FIG. 18 shows a laser device 200 comprising amplifier modules 100'a and 100'b, end mirror 142 and outcoupling mirror 144 forming an unstable resonator, static phase corrector 148, and coolant loop 146. Laser beam 64" oscillates between the mirrors 142 and 144, and portion 64''' is outcoupled. The coolant flow loop 146 further comprises a compressor 152, heat exchanger 154 and interconnecting lines. Warm coolant 52 exhausted from the amplifier modules 100'a and 100'b is collected into return line 156 which feeds the compressor 152. The compressor 152 receives the coolant 52, compresses it and discharges compressed coolant into heat exchanger 154. The heat exchanger 154 thermally conditions the coolant to the appropriate temperature and conveys it into feed line 158 that delivers it to amplifier modules 100a and 100b.

Figure 19:
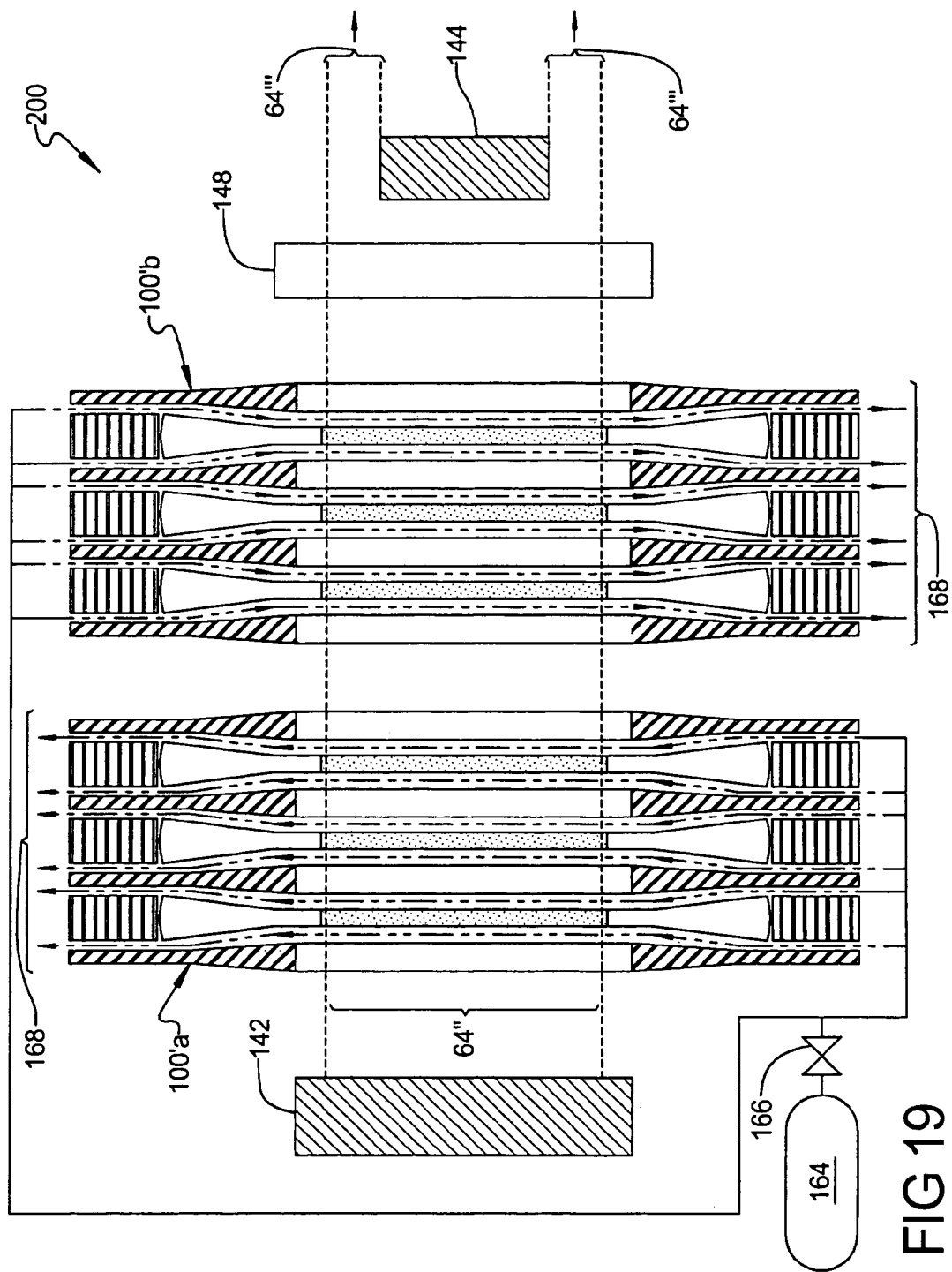
FIG. 19 is a cross-sectional view of a laser device with an open coolant loop.

FIG. 19 shows a laser device 200' which is similar to laser device 200 except that the coolant loop 162 is open. The coolant loop 162 comprises a gas storage tank 164, control valve 166, and interconnecting lines. As demanded for operation of laser device 200', coolant 52 is released from the storage tank 164 by control valve 166 and flowed into the feed line 168 that delivers it to amplifier modules 100'a and 100'b. Coolant 52 exiting from the amplifier modules 100'a and 100'b forms an exhaust flow 168 which is vented to atmosphere.

Figure 20:
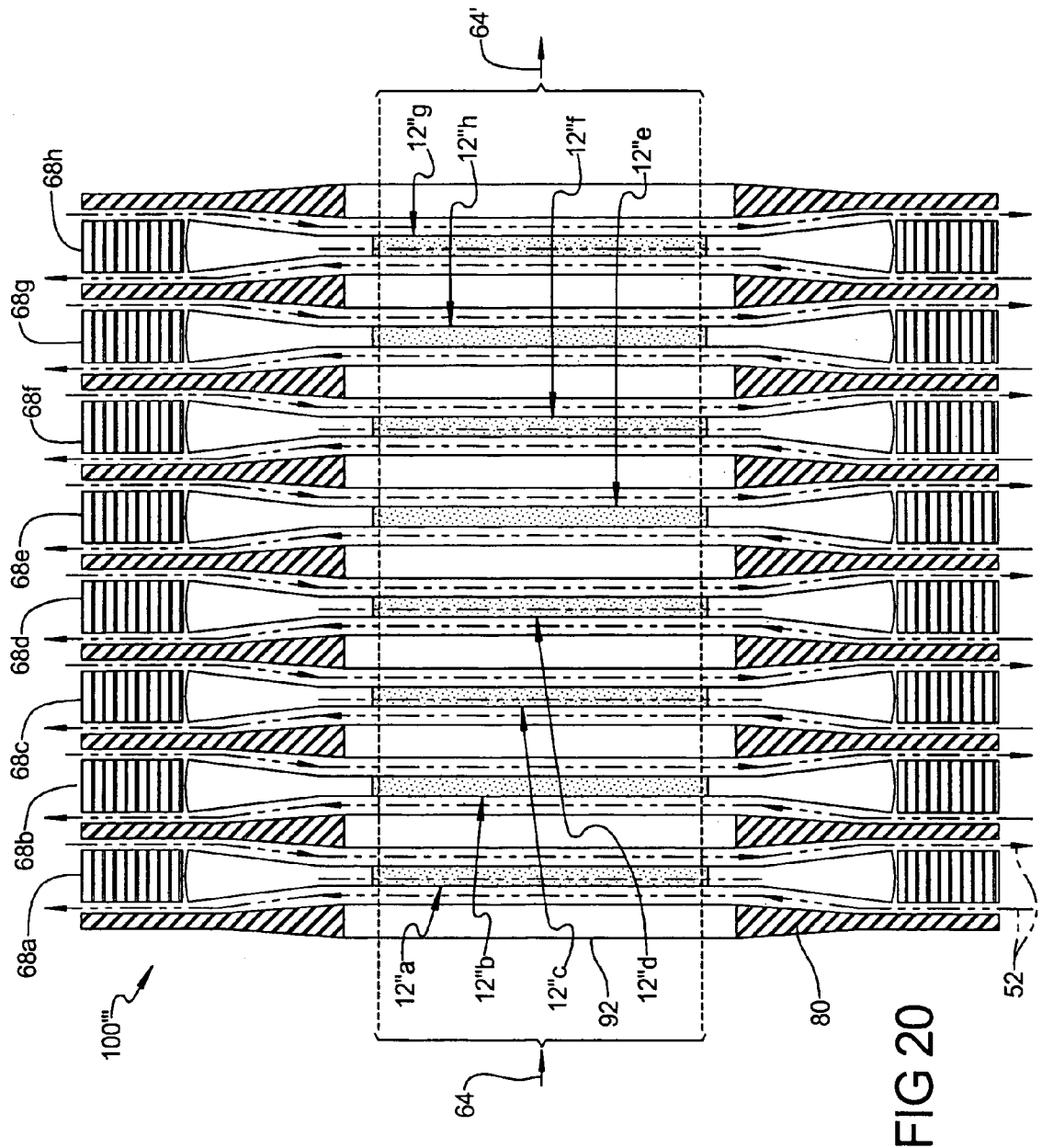
FIG. 20 is a cross-sectional view of an amplifier bank with sequenced excitation of optical pump sources.

FIG. 20 shows an SSDL amplifier bank 100''' that reduces the time-averaged heat load to laser gain medium assemblies 12". The laser gain medium assemblies 12"a through 12" are respectively pumped by optical radiation sources 68a through 68h sequentially rather than all at the same time. For example, first the optical pump radiation source 68a is energized to pump laser gain medium assembly 12'a. Subsequently the optical pump radiation source 68a is turned off and, possibly after a pause, optical pump radiation source 68b is energized to pump laser gain medium assembly 12"b, and so on, and the process is repeated. Alternately, laser gain medium assemblies 12" can be pumped in groups. For example, laser gain medium assemblies 12"a, 12"c, 12"e, and 12"g are pumped as one group first and then turned off followed by pumping laser gain medium assemblies 12"b, 12"d, 12"f, and 12"h. Since coolant 52 is flowed preferably in continuous fashion, surfaces of all of the laser gain medium assemblies 12"a through 12" are utilized for heat removal.

Figure 21A:
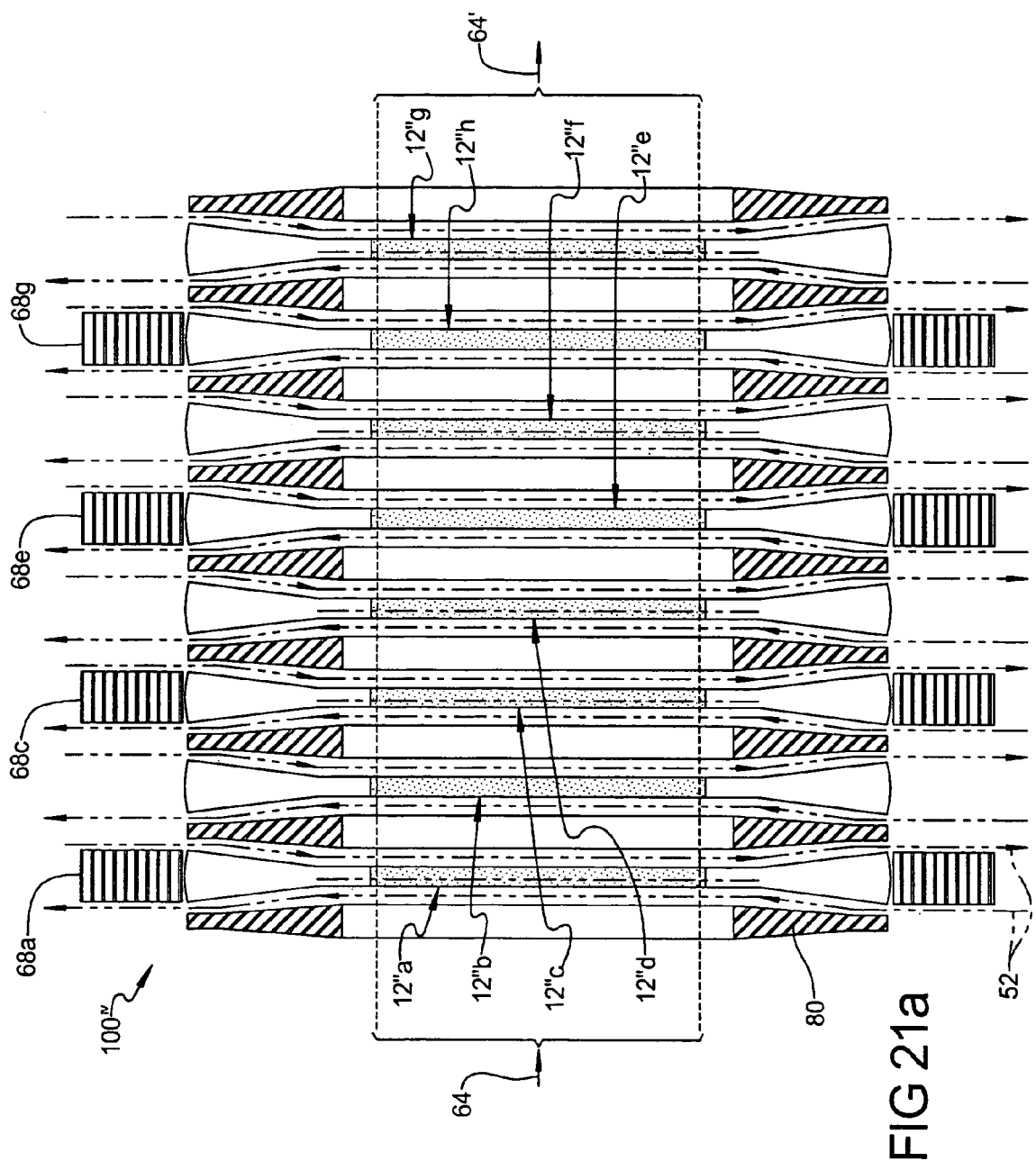
FIGS. 21a and 21b show an amplifier bank.
Figure 21B:
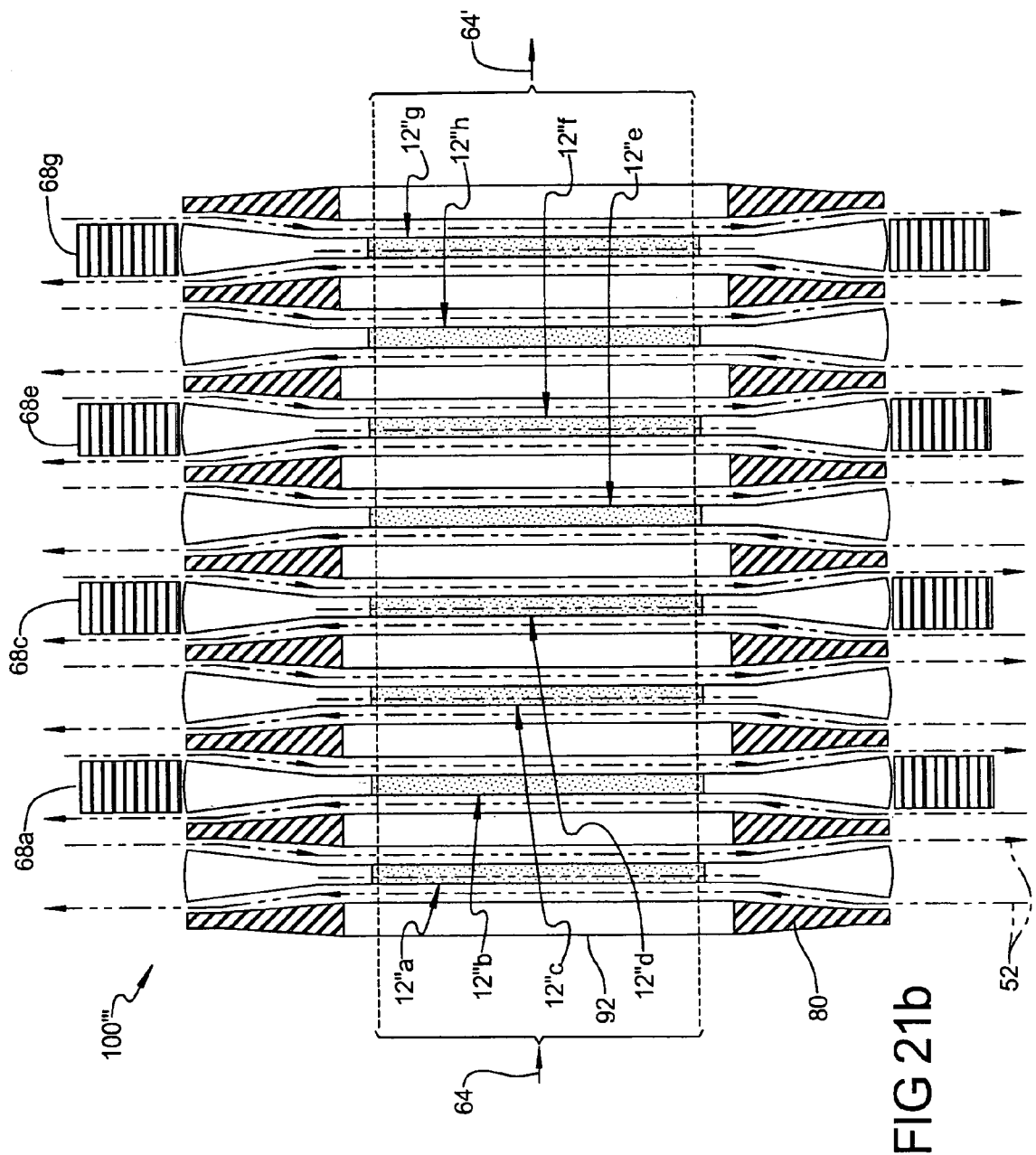

FIGS. 21a and 21b show an SSDL amplifier bank 100$^{iv}$ that reduces the time-averaged heat load to laser gain medium assemblies 12". Similar to SSDL amplifier bank 100''' the optical pump in SSDL amplifier bank 100$^{iv}$ is also provided to selected laser gain medium assemblies on alternating basis. However, in SSDL amplifier bank 100$^{iv}$ the selection is accomplished by a combination of mechanical and electrical means rather than solely by electrical excitation means. For example, in FIG. 21a optical pump radiation sources 68a, 68c, 68e, and 68g are positioned and energized to pump laser gain medium assembly 12"a, 12"c, 12"e, and 12"g. After predetermined pump period (typically 1 to 10 seconds) the optical pump radiation sources 68a, 68c, 68e, and 68g are re-positioned and energized to pump laser gain medium assembly 12"b, 12"d, 12"f, and 12"h. After predetermined pump period in this position the cycle may be repeated. Alternate means for switching optical pump radiation to selected laser gain medium assemblies is by optical switching that can used reflecting and/or refracting components. Such components can be activated electrically and/or mechanically.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A solid state laser module for amplification of laser radiation, comprising:
    a laser gain medium having a pair of generally parallel surfaces and forming a disc-like shape;
    said pair of surfaces being adapted for at least one of receiving and transmitting laser radiation;
    at least one perimetral optical medium disposed adjacent a peripheral edge of said laser gain medium and in optical communication with said laser gain medium;
    a source of optical pump radiation for directing optical pump radiation into said perimetral optical medium generally parallel to said generally parallel surfaces; and
    said perimetral optical medium operating to transport said optical pump radiation into said laser gain medium and to pump said laser gain medium to a laser transition level.

2. The laser module of claim 1, wherein said perimetral optical medium is attached to said peripheral edge of said laser gain medium.

3. The laser module of claim 1, wherein said perimetral optical medium is in thermal communication with said laser gain medium.

4. A solid-state laser module for amplification of laser radiation comprising:
    a laser gain medium having a pair of surfaces having a first dimension, said pair of surfaces further being opposed to each other and being separated by a peripheral edge surface of said laser gain medium, said laser gain medium having a thickness representing a second dimension which is substantially smaller than said first dimension;
    said pair of surfaces thereof being adapted for receiving and transmitting said laser radiation;
    at least one perimetral optical medium attached to said peripheral edge surface and in mechanical, thermal, and optical communication therewith;
    a source of optical pump radiation; said source directing optical pump radiation into said perimetral optical medium; and
    said perimetral optical medium transporting said optical pump radiation into said laser gain medium and pumping said laser gain medium to a laser transition level.

5. The laser module of claim 4, wherein said pair of surfaces of said laser gain medium are generally at a Brewster angle with respect to an axis of propagation of said laser radiation.

6. The laser module of claim 4, wherein said pair of surfaces of said laser gain medium are generally normal with respect to an axis of propagation of said laser radiation, and further have optical coatings for providing reduced reflectivity at a lasing wavelength of said laser gain medium.

7. The laser module of claim 4, wherein at least one of said pair of surfaces is cooled by a cooling medium flowing in a direction generally parallel to said surfaces.

8. The laser module of claim 7, wherein the cooling medium comprises a gaseous form.

9. The laser module of claim 4, wherein said peripheral edge of said laser gain medium has a shape selected from the group of shapes consisting of circular, elliptical, rectangular, pentagonal, hexagonal, heptagonal, octagonal, and polygonal.

10. The laser module of claim 4, wherein said peripheral edge surface of said laser gain medium comprises a plurality of planar sections; and
wherein said laser gain medium includes a corresponding plurality of perimetral optical medium sections that are secured to said planar sections via a bond which is transparent at wavelengths of said optical pump radiation and at a lasing wavelength of said laser gain medium.

11. The laser module of claim 4, wherein said perimetral optical medium is secured to said peripheral edge via a bond which is transparent at wavelengths of said optical pump radiation and at a lasing wavelength of said laser gain medium.

12. The laser module of claim 4, wherein said optically transparent bond is produced by one of the group consisting of: fusion bonding, diffusion bonding, optical contacting followed by heat treatment, and adhesive bonding.

13. The laser module of claim 4, wherein laser gain medium comprises a host lattice, and wherein at least one of said host lattice and said perimetral optical medium are selected from the group consisting of:
yttrium aluminum garnet YAG), gadolinium gallium garnet (GGG), gadolinium scandium gallium garnet (GSGG), polycrystalline YAG, polycrystalline GGG, yittrium lithium fluoride (YLF), yttrium vanadate, potassium gadolinium tungstate (KGd(WO$_4$)$_2$), potassium yttrium tungstate (KY(WO$_4$)$_2$), phosphate glass, athermal glass, silicate glass, transparent ceramics, and sapphire.

14. The laser module of claim 13, wherein said host lattice is doped with at least one material selected from the group consisting of: Ti, Cu, Co, Ni, Cr, Ce, Pr, Nd, Sm, Eu, Gd, Tb, Dy, Ho, Er, Tm, and Yb.

15. The laser module of claim 4, wherein said laser gain medium comprises trivalent Yb ion.

16. The laser module of claim 15, wherein said trivalent Yb ion is doped into host material selected from the group consisting of: YAG, GGG, polycrystalline YAG, polycrystalline GGG, phosphate glass, athermal glass; and transparent ceramics.

17. The laser module of claim 15 wherein the optical pump radiation is provided at the wavelength generally corresponding to a zero-phonon spectral line of the trivalent Yb ion.

18. The laser module of claim 4, wherein said laser gain medium comprises trivalent Nd ion.

19. The laser module of claim 18, wherein said trivalent Nd ion is doped into host material selected from the group consisting of: YAG, GGG, polycrystalline YAG, polycrystalline GGG, phosphate glass, athermal glass, transparent ceramics.

20. The laser module of claim 4, wherein said source of optical pump radiation comprises a diode laser array.

21. The laser module of claim 18, wherein the optical pump radiation is provided at the wavelength of an absorption feature of the trivalent Nd ion at about 880 nanometers corresponding to direct energy deposition into an upper laser level.

22. The laser module of claim 4, wherein the optical pump source is comprised of at least one diode laser array.

23. The laser module of claim 4, wherein said optical pump source comprises a plurality of microlenses.

24. The laser module of claim 4, further comprising a plurality of said optical pump sources, and wherein said optical pump sources are arranged in a pattern generally larger and of the same shape as the perimeter of said laser gain medium and with individual optical pump sources generally pointed towards said laser gain medium.

25. The laser module of claim 4, further comprising at least one tapered duct for concentration of said optical pump radiation, said tapered duct being interposed between said perimetral optical medium and a source of optical radiation for directing optical pump radiation toward said perimetral optical medium.

26. The laser module of claim 25, wherein said tapered duct is comprised of solid optical material.

27. The laser module of claim 25, wherein said tapered duct comprises a hollow duct.

28. The laser module of claim 25, wherein said hollow duct is filled with a liquid highly transparent at the wavelength of said optical pump radiation.

29. The laser module of claim 4, wherein said perimetral optical medium includes at least one tapered portion for concentration of said optical pump radiation.

30. The laser module of claim 4, wherein said perimetral optical medium includes at least one curved surface to provide a lensing effect for concentration of said optical pump radiation.

31. The laser module of claim 4, wherein said laser gain medium is suspended by said perimetral optical medium.

32. The laser module of claim 4, wherein said laser gain medium is operated in a heat capacity mode so as to be injected with said optical pump radiation on and off intermittently depending on a temperature of said laser gain medium.

33. The laser module of claim 4, wherein said laser gain medium is continuously cooled.

34. The laser module of claim 4, wherein said laser gain medium is cooled by a cooling medium flowing over said pair of first surfaces.

35. The laser module of claim 34, wherein said cooling medium comprises a gaseous form.

36. A solid-state laser module comprising:
a laser gain medium having a pair of surfaces opposite to each other having a first dimension, a peripheral edge surface therebetween, and a thickness forming a second dimension;
a plurality of sources of optical pump radiation, said sources being arranged around said peripheral edge and directing optical pump radiation thereinto, said arrangement of said sources being chosen to produce generally uniform laser gain within a volume of said laser gain medium; and at least one perimetral optical medium affixed to said peripheral edge via an optically transparent bond, said perimetral optical medium conveying said optical pump radiation into said peripheral edge.

37. The laser module of claim 36, further comprising at least one lensing element disposed between one of said sources of optical pump radiation and said peripheral edge, said lensing element concentrating said optical pump radiation into said peripheral edge.

38. The laser module of claim 36, further comprising at least one tapered optical duct disposed between at least one of said sources of optical pump radiation and said peripheral edge, said tapered optical duct concentrating said optical pump radiation into said peripheral edge.

39. The laser module of claim 36, wherein said optically transparent bond is produced by an optical contacting method.

40. The laser module of claim 36, wherein said tapered optical duct comprises a hollow tapered duct.

41. The laser module of claim 36, wherein said tapered optical duct comprises a solid tapered duct made of an optical medium generally transparent to said optical pump radiation.

42. The laser module of claim 36, wherein said tapered optical duct comprises a liquid-filled tapered duct; said liquid being highly transparent to said optical pump radiation.

43. A laser amplifying system comprising:
a laser gain medium having first and second surfaces each having a first dimension and being separated by a peripheral edge surface, said peripheral edge surface having a thickness representing a second dimension substantially smaller than said first dimension;
each of said pair of surfaces including an anti-reflection coating being substantially totally transmissive of radiation at a wavelength at which laser gain is produced therein;
an perimetral optical medium affixed to said peripheral edge surface of said laser gain medium;
a system for providing pump radiation to said perimetral optical medium;
a system for providing laser radiation to said laser gain medium for amplification therein; and
a system for flowing cooling fluid over at least one of said pair of surfaces.

44. The laser amplifying system as defined in claim 43, wherein a cooling fluid is flowed to directly wet said surface of said laser gain medium to remove heat from said medium.

45. The laser amplifying system as defined in claim 43, wherein heat generated in said laser gain medium is conducted across said second surfaces into said rigid substrate, said rigid substrate including a plurality of cooling channels not connected to said internal passages, and wherein a cooling fluid is flowed through said cooling channels inside said rigid substrate and removes heat therefrom.

46. The laser amplifying system as defined in claim 43, wherein said first and second surfaces of said laser gain medium are planar and generally parallel.

47. A laser amplifying system comprising:
a rigid substrate having a plurality of internal passages forming channels opening onto one of its surfaces;
a laser gain medium having first and second surfaces each having a first dimension and being separated by a peripheral edge surface, said peripheral edge surface having a thickness representing a second dimension substantially smaller than said first dimension;
each of said pair of surfaces including an anti-reflection coating being substantially totally transmissive of radiation at a wavelength at which laser gain is produced therein;
an perimetral optical medium affixed to said peripheral edge surface of said laser gain medium;
a system for providing pump radiation to said perimetral optical medium;
a system for providing laser radiation to said laser gain medium for amplification therein; and
a system for flowing cooling fluid over at least one of said pair of surfaces.

48. The laser amplifying system as defined in claim 47, wherein a cooling fluid is flowed through said internal passages inside said rigid substrate, and said cooling fluid directly wets said surface of said laser gain medium in contact with rigid substrate to remove heat from said medium.

49. The laser amplifying system as defined in claim 47, wherein heat generated in said laser gain medium is conducted across said second surface into said rigid substrate, said rigid substrate including a plurality of cooling channels not connected to said internal passages, and wherein a cooling fluid is flowed through said cooling channels inside said rigid substrate and removes heat therefrom.

50. The laser amplifying system as defined in claim 47, wherein said first and second surfaces of said laser gain medium are planar and generally parallel when subjected to a difference in pressure between said passages of said rigid substrate and an exterior of said first surface of said laser gain medium, and said surface of said rigid substrate facing said laser gain medium being planar.

51. The laser module of claim 7, wherein said coolant is recirculated between said module and a heat exchanger for removing heat from said laser module.

52. The laser module of claim 8, wherein said gaseous form is stored in a tank under pressure and therefrom flowed in a controlled fashion through said laser module and exhausted into atmosphere.

53. The laser module of claim 4, wherein said perimetral optical medium is doped with material significantly absorbing optical radiation at laser wavelength of said laser gain medium and having generally low absorption at the wavelength of said optical pump radiation.

54. The laser module of claim 4, wherein said laser gain medium comprises trivalent neodymium ions and said perimetral optical medium comprises divalent ions selected from the group of samarium and cobalt.

55. The laser module of claim 4, wherein said laser gain medium comprises trivalent erbium ions and said perimetral optical medium comprises divalent cobalt ions.

56. The laser module of claim 4, wherein said perimetral optical medium is formed to trap amplified spontaneous emission from said laser gain medium.

57. A laser amplifying system comprising:
A plurality of laser gain media each having first and second surfaces each having a first dimension and being separated by a peripheral edge surface, said peripheral edge surface having a thickness representing a second dimension substantially smaller than said first dimension;
each of said pair of surfaces including an anti-reflection coating being substantially totally transmissive of radiation at a wavelength at which laser gain is produced therein;
said laser gain media arranged side-by-side with said first and second surfaces of each laser gain medium being generally parallel to first and second surfaces of adjacent laser gain media thereby forming flow channels for flowing coolant therebetween;
a system comprising optical pump radiation sources for providing pump radiation to said perimetral edge of said said laser gain media;
a system for providing laser radiation to said laser gain medium for amplification therein; and
a system for flowing cooling fluid through said flow channels.

58. A laser amplifying system as in claim 57 wherein spacers are inserted into said flow channels to reduce the width thereof; said spacers being transparent at laser radiation wavelength.

59. A laser amplifying system as in claim 57 wherein said coolant is flowed anti-parallel in adjacent flow channels.

60. A laser amplifying system as in claim 57 wherein said optical pump radiation is alternated between selected groups of said laser gain media.

61. A laser amplifying system as in claim 57 wherein said optical pump radiation is alternated between selected groups of said laser gain media by a method selected from the group consisting of electric excitation, mechanical positioning, and optical switching.

62. A laser amplifying system as in claim 57 wherein said laser gain media are positioned so as to reduce correlation of optical path errors therein.

63. A laser amplifying system as in claim 57 wherein said optical pump radiation sources are positioned so as to reduce correlation of optical path errors therein.

* * * * *